(12) United States Patent
Moore et al.

(10) Patent No.: US 11,016,756 B1
(45) Date of Patent: May 25, 2021

(54) APPLICATION REPOSITORY PROTOCOL FOR DISPARATE ENTITY APPLICATIONS

(71) Applicant: Kahua, Inc., Alpharetta, GA (US)

(72) Inventors: Brian Michael Moore, Alpharetta, GA (US); Jeffrey D Dempsey, Sunset, SC (US); Colin Charles Whitlatch, Edgewater, MD (US); Kenneth Scott Unger, Alpharetta, GA (US)

(73) Assignee: KAHUA, INC., Alpharetta, GA (US)

( * ) Notice: Subject to any disclaimer, the term of this patent is extended or adjusted under 35 U.S.C. 154(b) by 0 days.

(21) Appl. No.: 16/700,656

(22) Filed: Dec. 2, 2019

Related U.S. Application Data

(63) Continuation-in-part of application No. 16/399,384, filed on Apr. 30, 2019, now Pat. No. 10,496,557.
(Continued)

(51) Int. Cl.
*G06F 9/44* (2018.01)
*G06F 8/658* (2018.01)
(Continued)

(52) U.S. Cl.
CPC .............. *G06F 8/658* (2018.02); *G06F 8/71* (2013.01); *G06F 16/219* (2019.01); *G06F 16/23* (2019.01);
(Continued)

(58) Field of Classification Search
CPC . G06F 8/71; G06F 16/289; G06F 8/65; G06F 16/21; G06F 8/658; G06F 21/53;
(Continued)

(56) References Cited

U.S. PATENT DOCUMENTS

| 5,761,656 A | 6/1998 | Ben-Shachar |
| 6,397,191 B1 | 5/2002 | Notani et al. |

(Continued)

OTHER PUBLICATIONS

Chen, Qiming, and Meichun Hsu. Inter-Enterprise Collaborative Business Process Management. Aug. 17, 2000. www.hpl.hp.com/techreports/2000/HPL-2000-107.pdf?jumpid=reg_R1002_USEN.
(Continued)

*Primary Examiner* — Tuan A Vu
(74) *Attorney, Agent, or Firm* — Morris, Manning & Martin, LLP; Bryan D. Stewart; Daniel T. Begasse

(57) ABSTRACT

An application versioning system and associated processes are disclosed for collaborative development of applications between a plurality of disparate network entities, as well as between a plurality of development groups within a single entity. In particular embodiments, the applications are developed within sandboxed computing environments associated with the network entities. Disparate entities, or certain groups within network entities, may be given permissioned access for downloading applications from, or uploading applications to, another entity's or group's sandboxed computing environment. Furthermore, copies of the applications may be modified, and the modifications made to the applications may be compared to prior versions of the application for merging applications into a new application version. In one embodiment, the new application version may replace prior application versions in the system.

14 Claims, 13 Drawing Sheets

Related U.S. Application Data

(60) Provisional application No. 62/691,380, filed on Jun. 28, 2018.

(51) Int. Cl.

| | | |
|---|---|---|
| *G06F 16/21* | (2019.01) | |
| *G06F 16/2455* | (2019.01) | |
| *G06F 8/71* | (2018.01) | |
| *G06F 21/53* | (2013.01) | |
| *G06F 16/28* | (2019.01) | |
| *G06F 16/23* | (2019.01) | |

(52) U.S. Cl.
CPC ...... *G06F 16/2365* (2019.01); *G06F 16/2456* (2019.01); *G06F 16/288* (2019.01); *G06F 21/53* (2013.01); *Y10S 707/99939* (2013.01)

(58) Field of Classification Search
CPC .. G06F 16/288; G06F 16/219; G06F 16/2456; Y10S 707/99939
See application file for complete search history.

(56) References Cited

U.S. PATENT DOCUMENTS

| | | |
|---|---|---|
| 6,850,939 B2 | 2/2005 | Bostleman et al. |
| 6,983,288 B1 * | 1/2006 | Kirkwood ............. G06F 16/289 |
| 7,072,940 B1 | 7/2006 | Day et al. |
| 7,076,778 B2 * | 7/2006 | Brodersen ................. G06F 8/65 |
| | | 717/170 |
| 7,236,939 B2 | 6/2007 | Chen et al. |
| 7,797,381 B2 | 9/2010 | Zhang et al. |
| 8,010,487 B2 | 8/2011 | Richardson et al. |
| 8,788,590 B2 | 7/2014 | Culver et al. |
| 9,535,924 B2 | 1/2017 | MacKenzie et al. |
| 9,652,741 B2 | 5/2017 | Goldberg et al. |
| 2002/0144255 A1 * | 10/2002 | Anderson ................. G06F 8/71 |
| | | 717/174 |
| 2003/0014617 A1 | 1/2003 | Tamboli et al. |
| 2006/0122990 A1 * | 6/2006 | Smith ..................... G06F 16/21 |
| 2007/0255713 A1 | 11/2007 | Li et al. |
| 2008/0262959 A1 | 10/2008 | Tupper et al. |
| 2010/0094803 A1 | 4/2010 | Yamakawa et al. |
| 2011/0264686 A1 | 10/2011 | Cavagnari et al. |
| 2011/0271201 A1 | 11/2011 | Cavagnari et al. |
| 2013/0167109 A1 | 6/2013 | Nucci et al. |
| 2013/0262372 A1 | 10/2013 | Dahod et al. |
| 2014/0236843 A1 | 8/2014 | Bain et al. |
| 2014/0317563 A1 | 10/2014 | O'Byrne |
| 2016/0099949 A1 | 4/2016 | Leondires et al. |
| 2016/0226973 A1 | 8/2016 | Appel et al. |
| 2016/0255089 A1 | 9/2016 | Diestler et al. |
| 2017/0048285 A1 | 2/2017 | Pearl et al. |
| 2017/0091879 A1 | 3/2017 | Kanner et al. |
| 2017/0147527 A1 | 5/2017 | Chandrasekaran et al. |

OTHER PUBLICATIONS

"Team Collaboration Software for Medium and Large Enterprises." EXo Platform, 2017, www.exoplatform.com/.

* cited by examiner

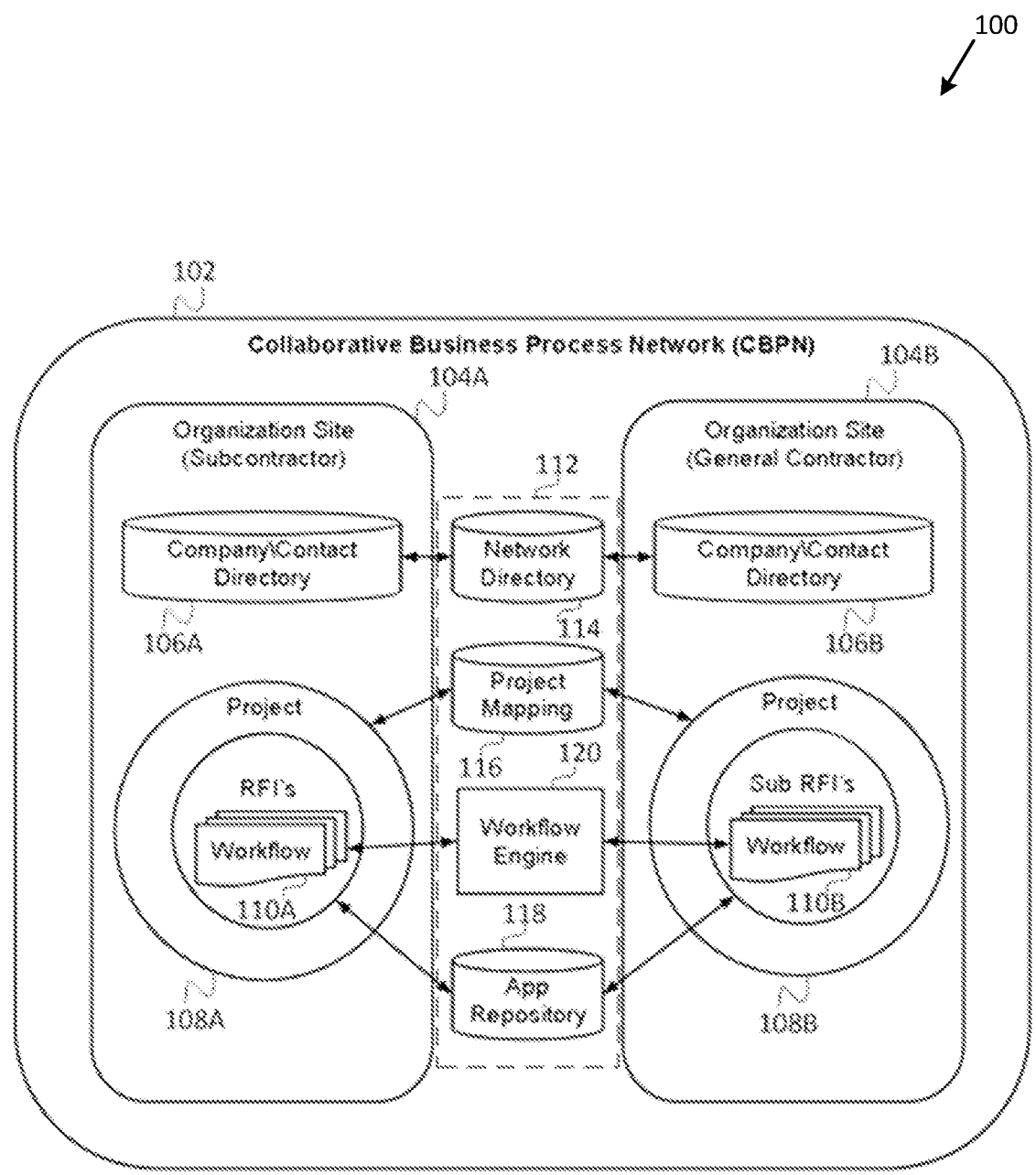
FIG. 1: EXEMPLARY PROCESS COLLABORATION SYSTEM

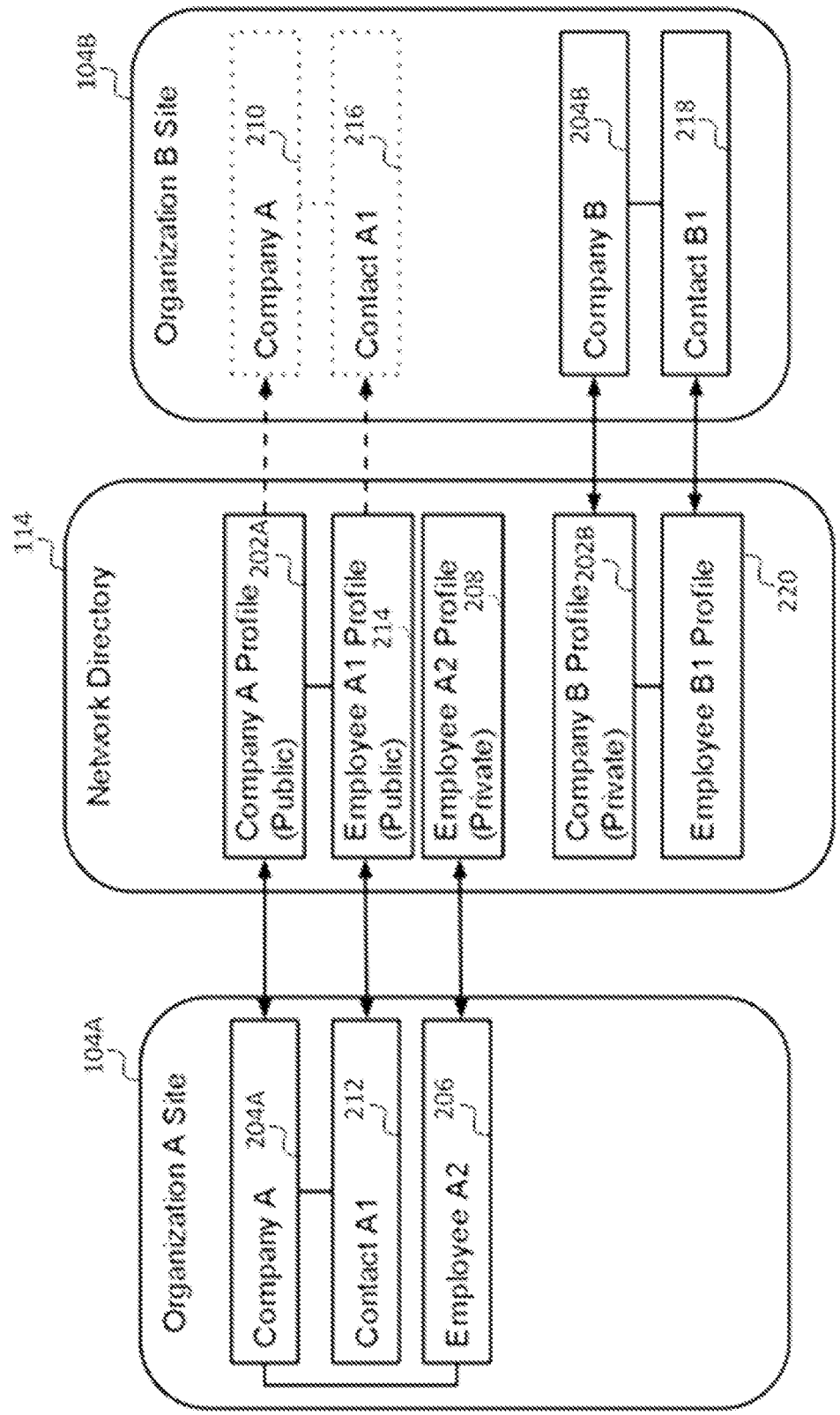
FIG. 2: EXEMPLARY NETWORK DIRECTORY

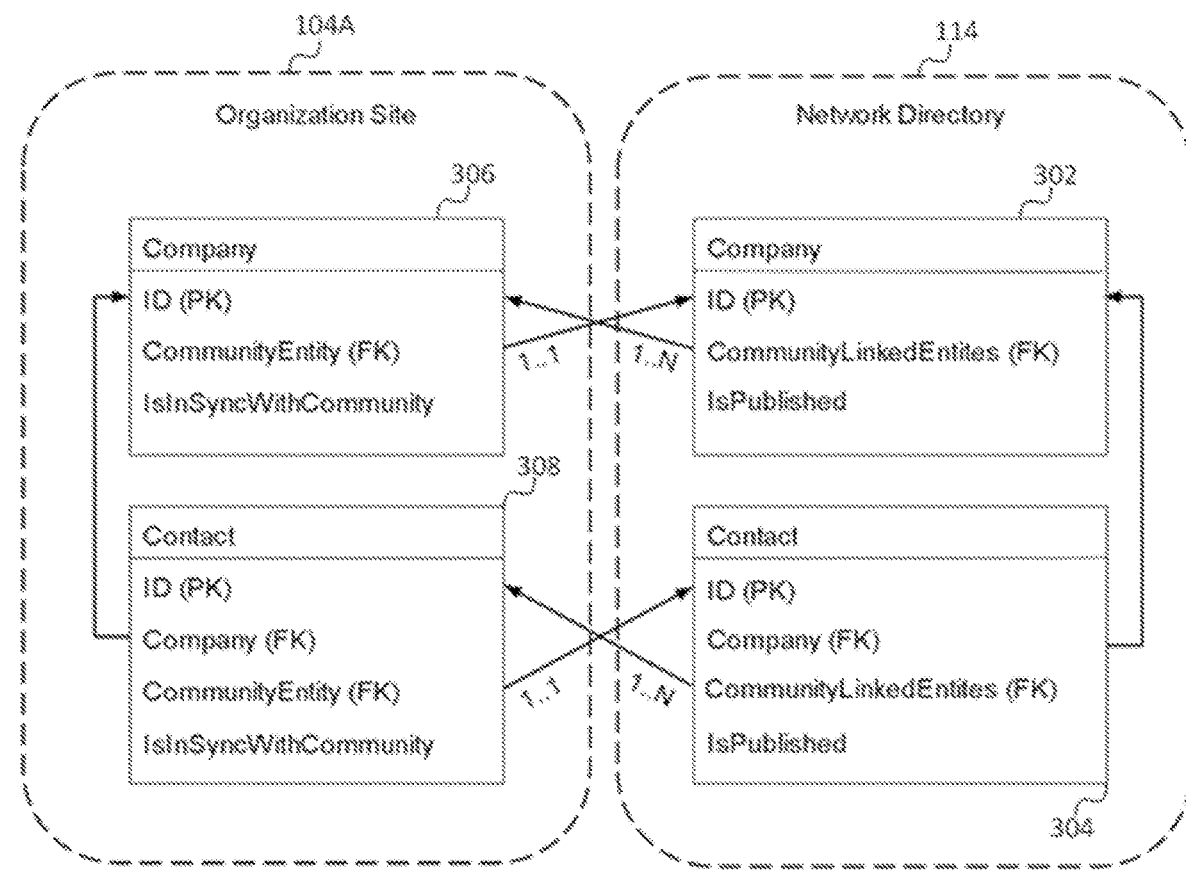
FIG. 3: EXEMPLARY NETWORK DIRECTORY LINKING

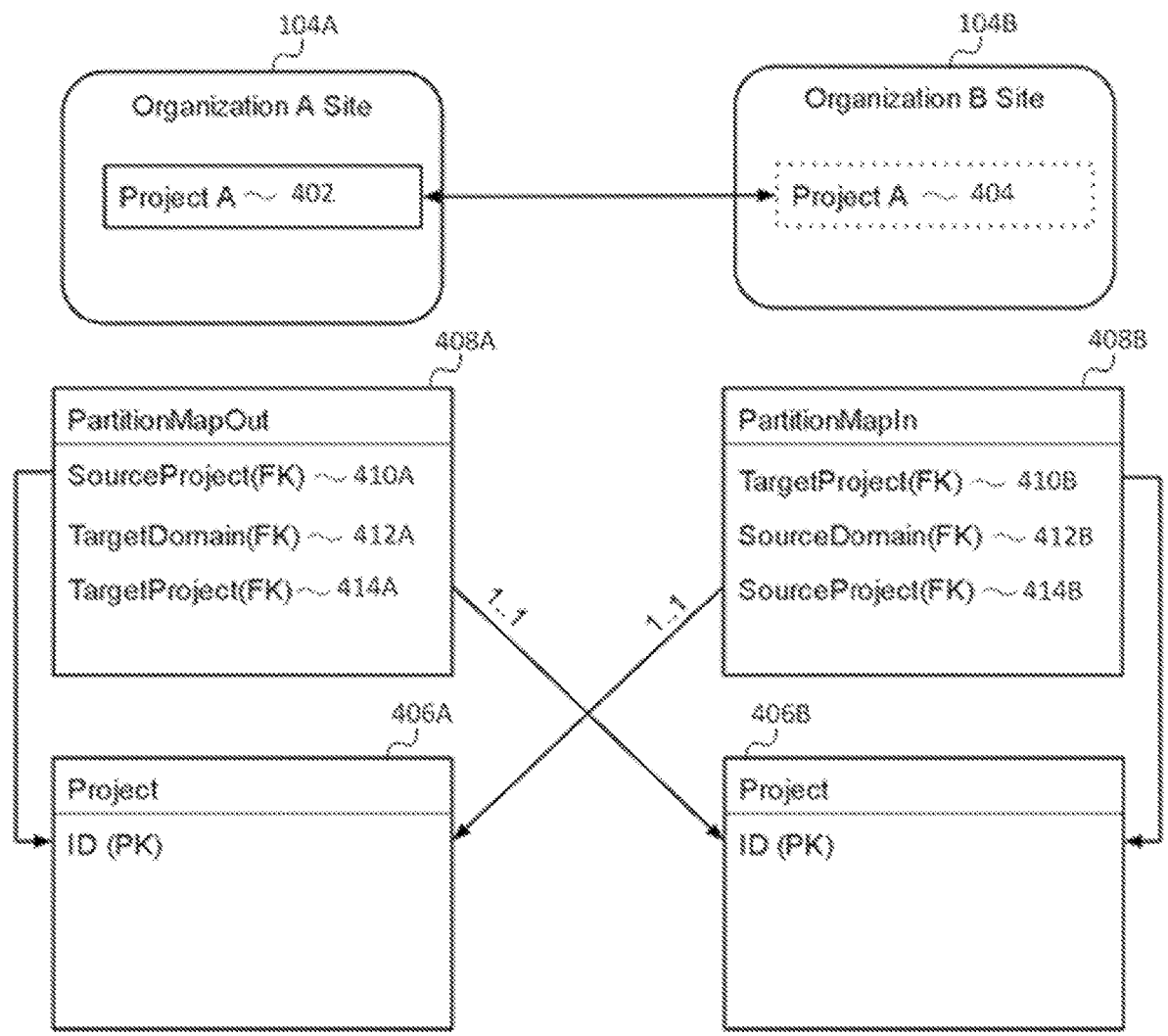
FIG. 4: EXEMPLARY PROJECT MAPPING

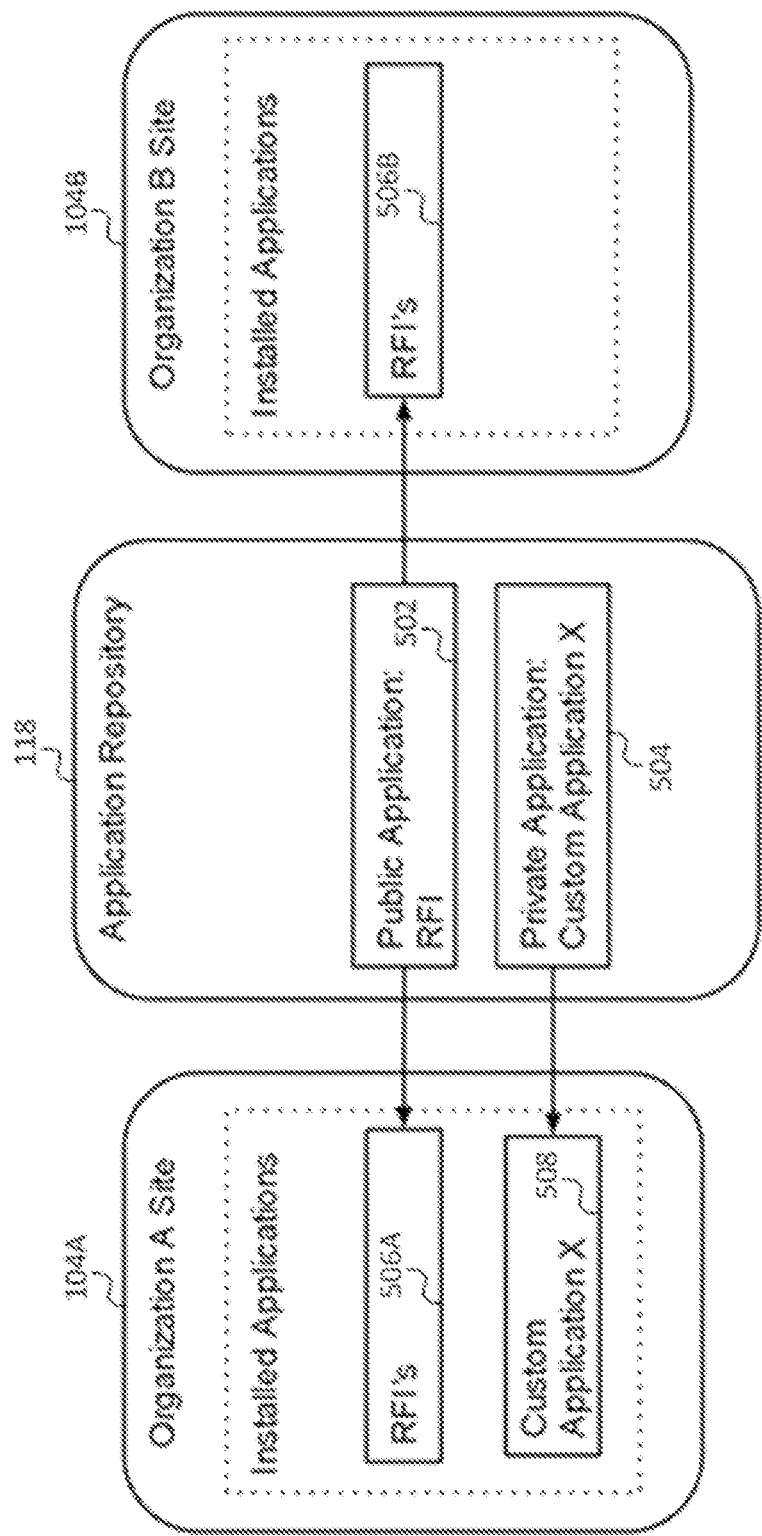
FIG. 5: EXEMPLARY APPLICATION REPOSITORY

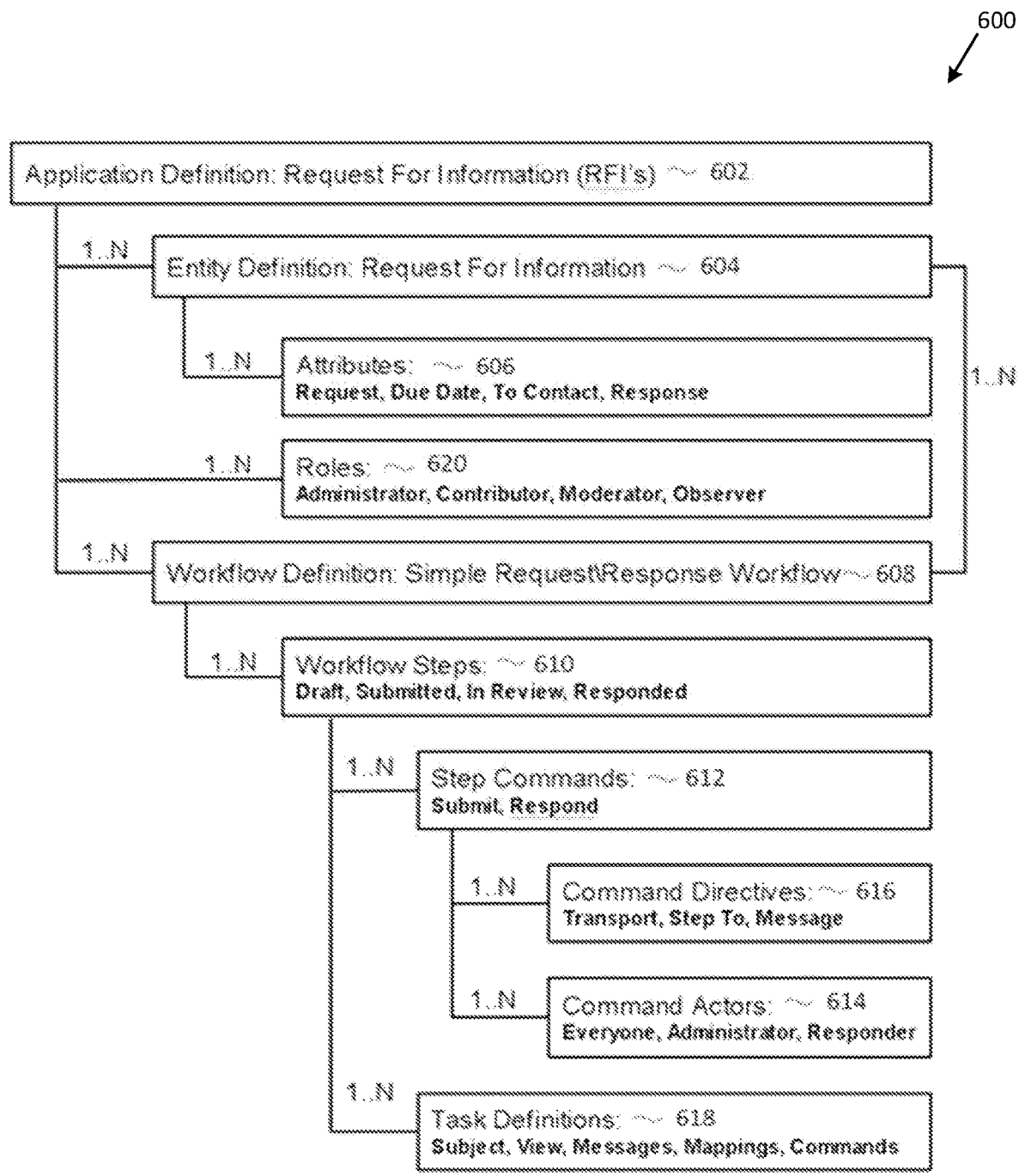
FIG. 6: EXEMPLARY APPLICATION HIERARCHY

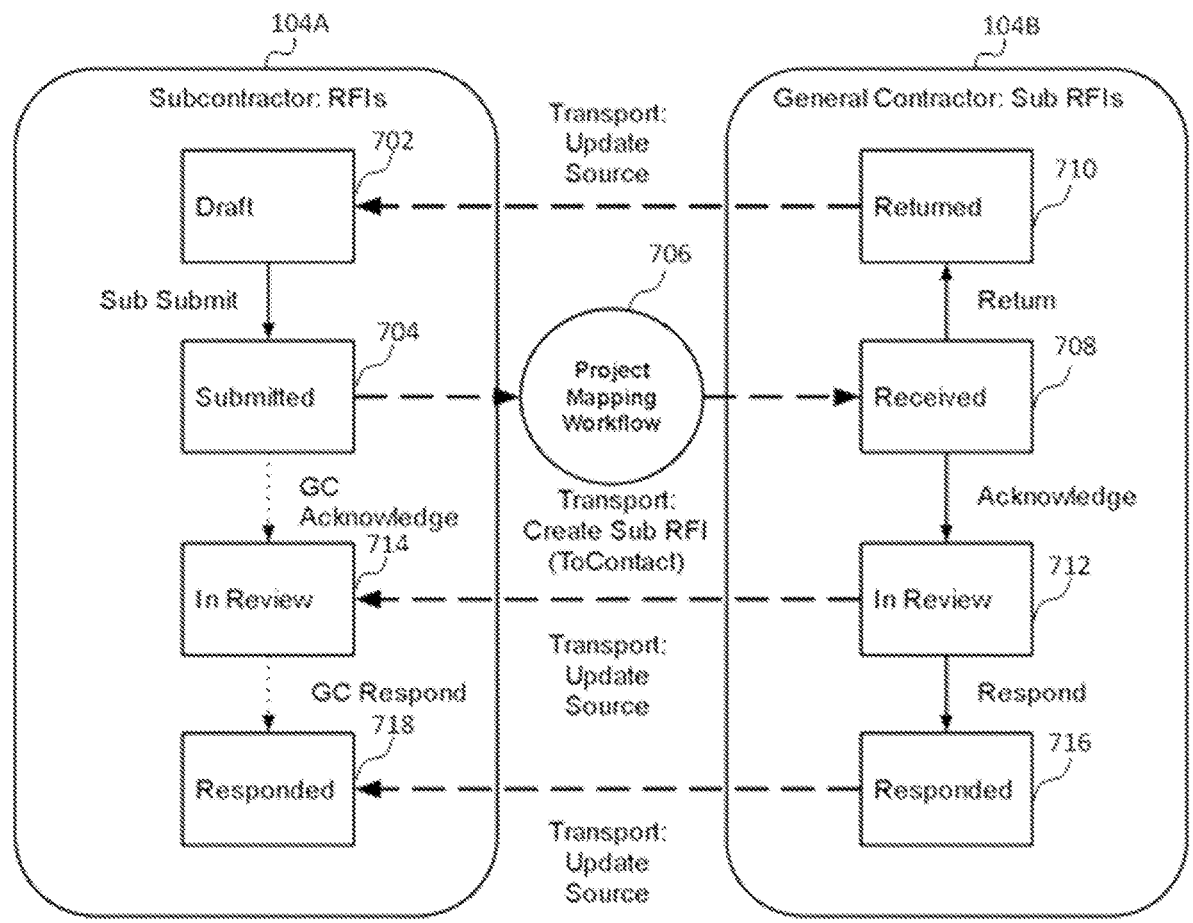
FIG. 7: EXEMPLARY TRANSPORT ENABLED PROCESS SEQUENCE

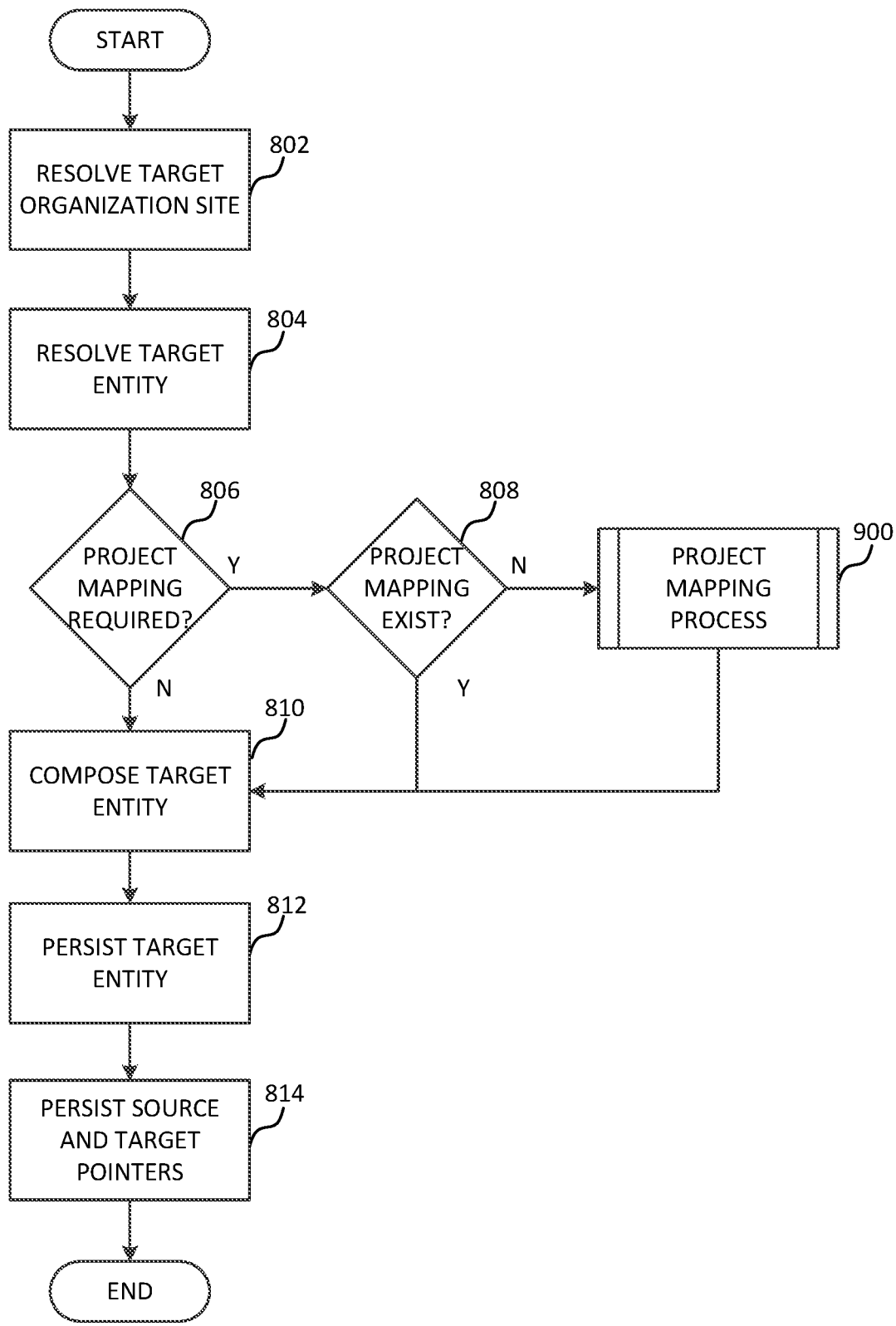
FIG. 8: EXEMPLARY TRANSPORT DIRECTIVE PROCESS

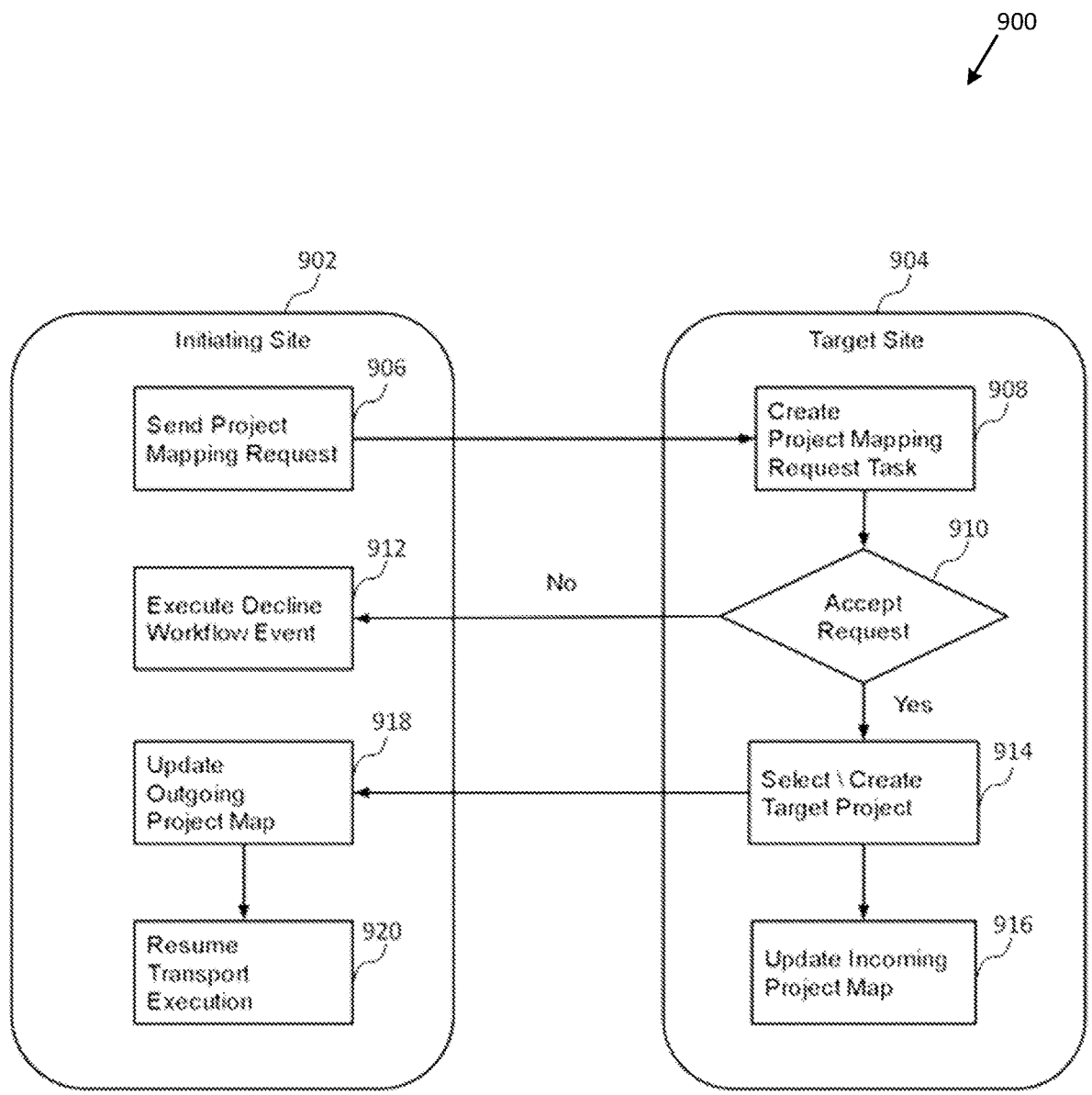
FIG. 9: EXEMPLARY PROJECT MAPPING PROCESS

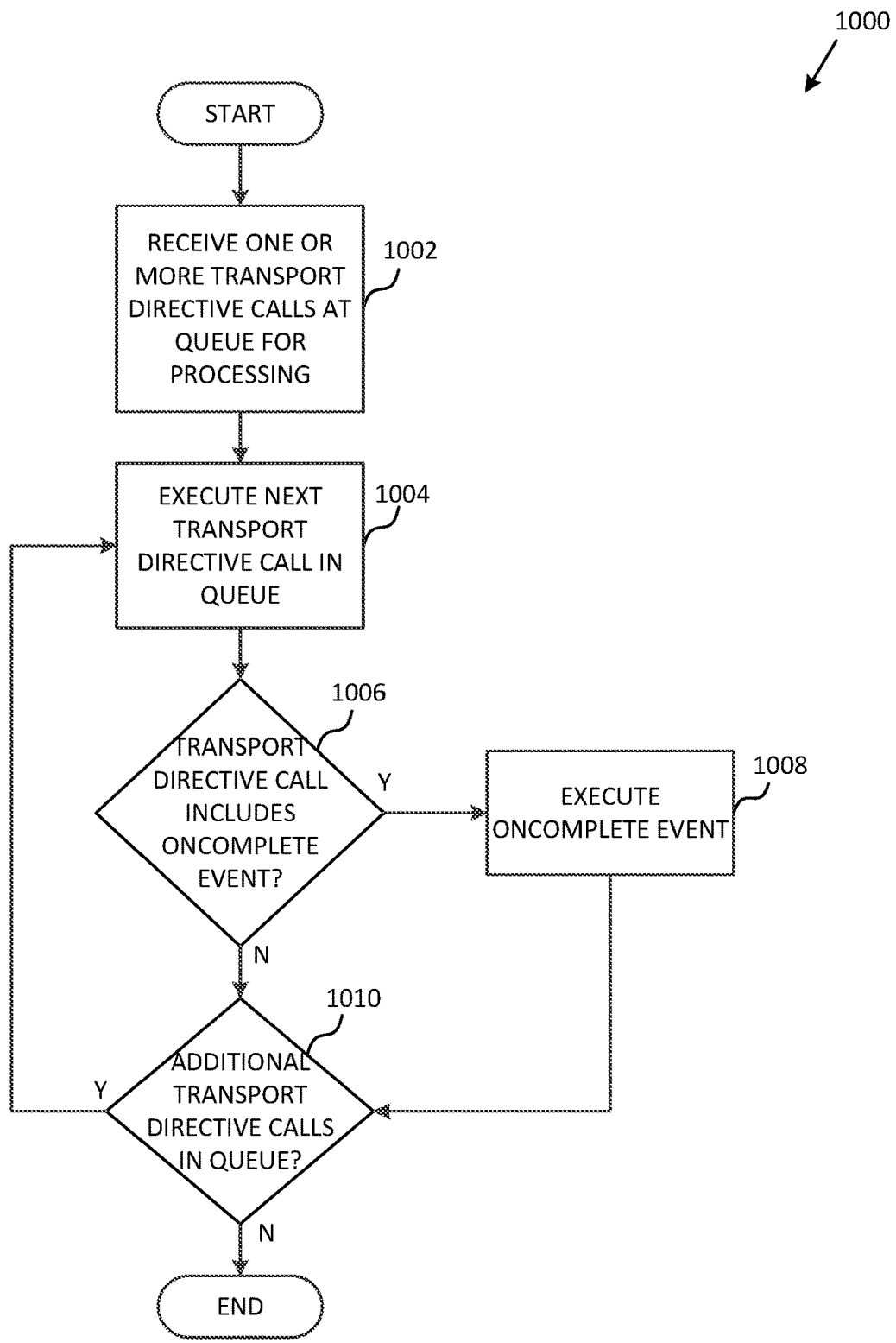
FIG. 10: EXEMPLARY DEFERRED TRANSPORT EXECUTION PROCESS

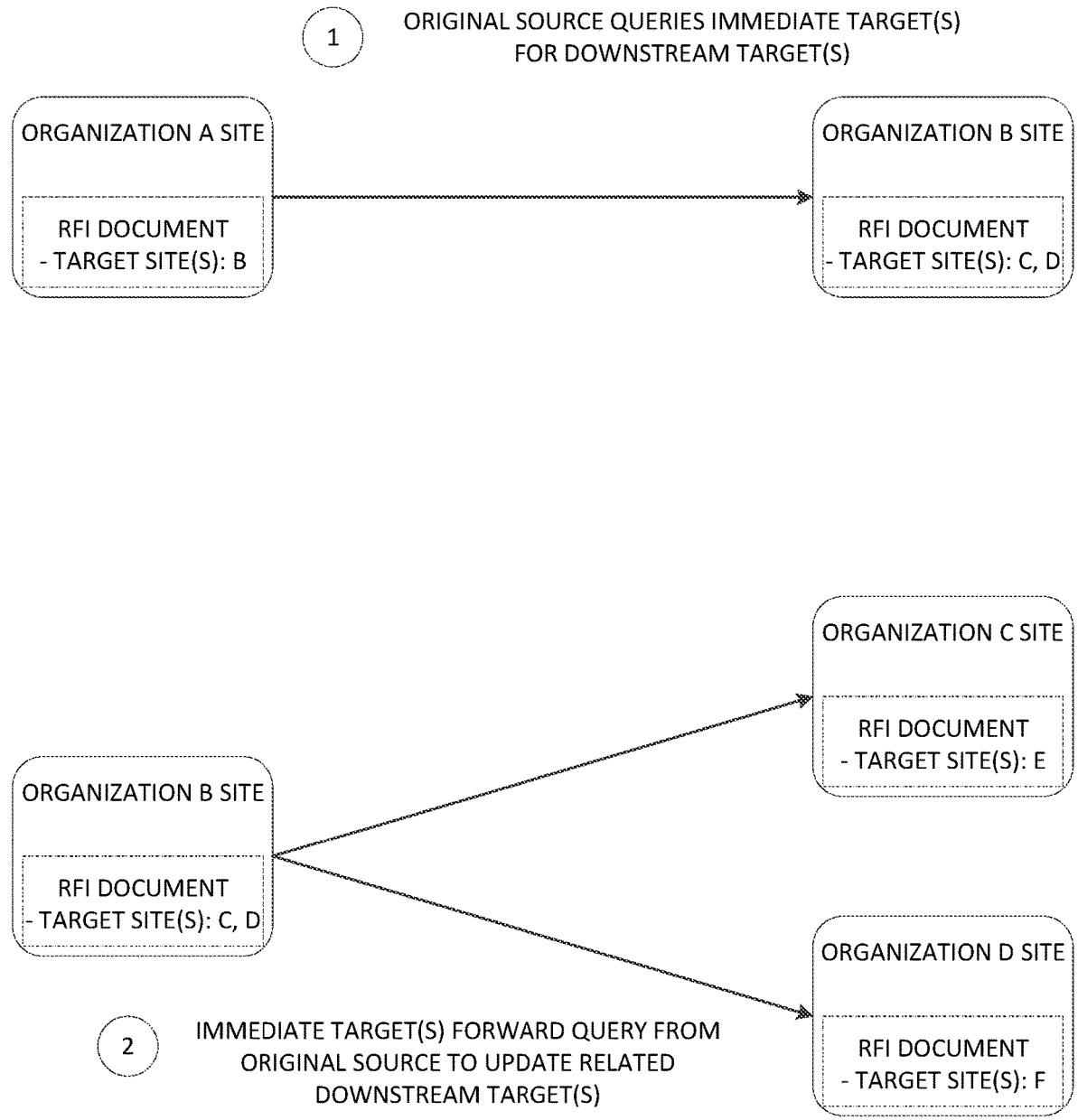
FIG. 11: EXEMPLARY REMOTE TRANSPORT DIRECTIVE

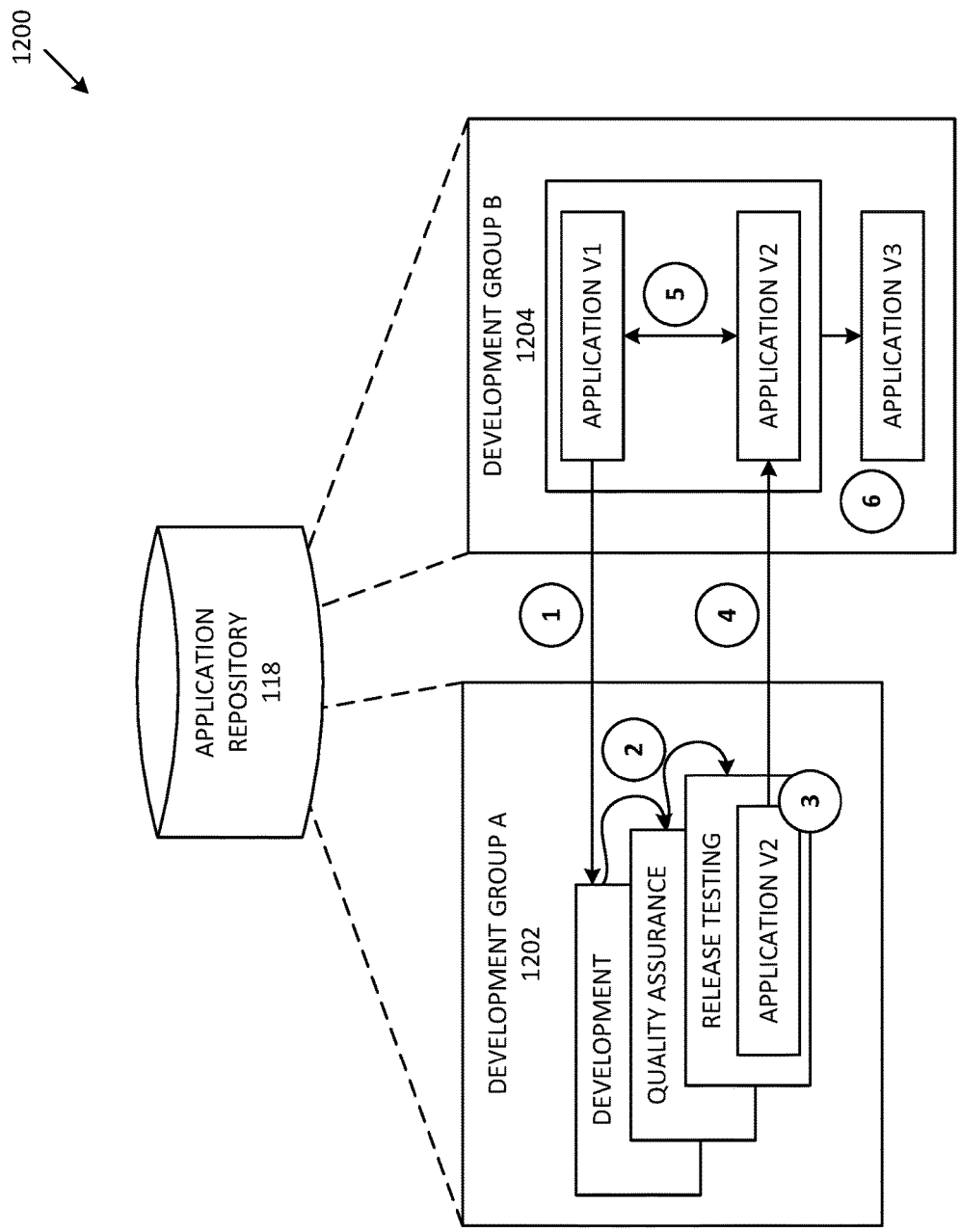
FIG. 12: EXEMPLARY APPLICATION REPOSITORY FUNCTIONALITY

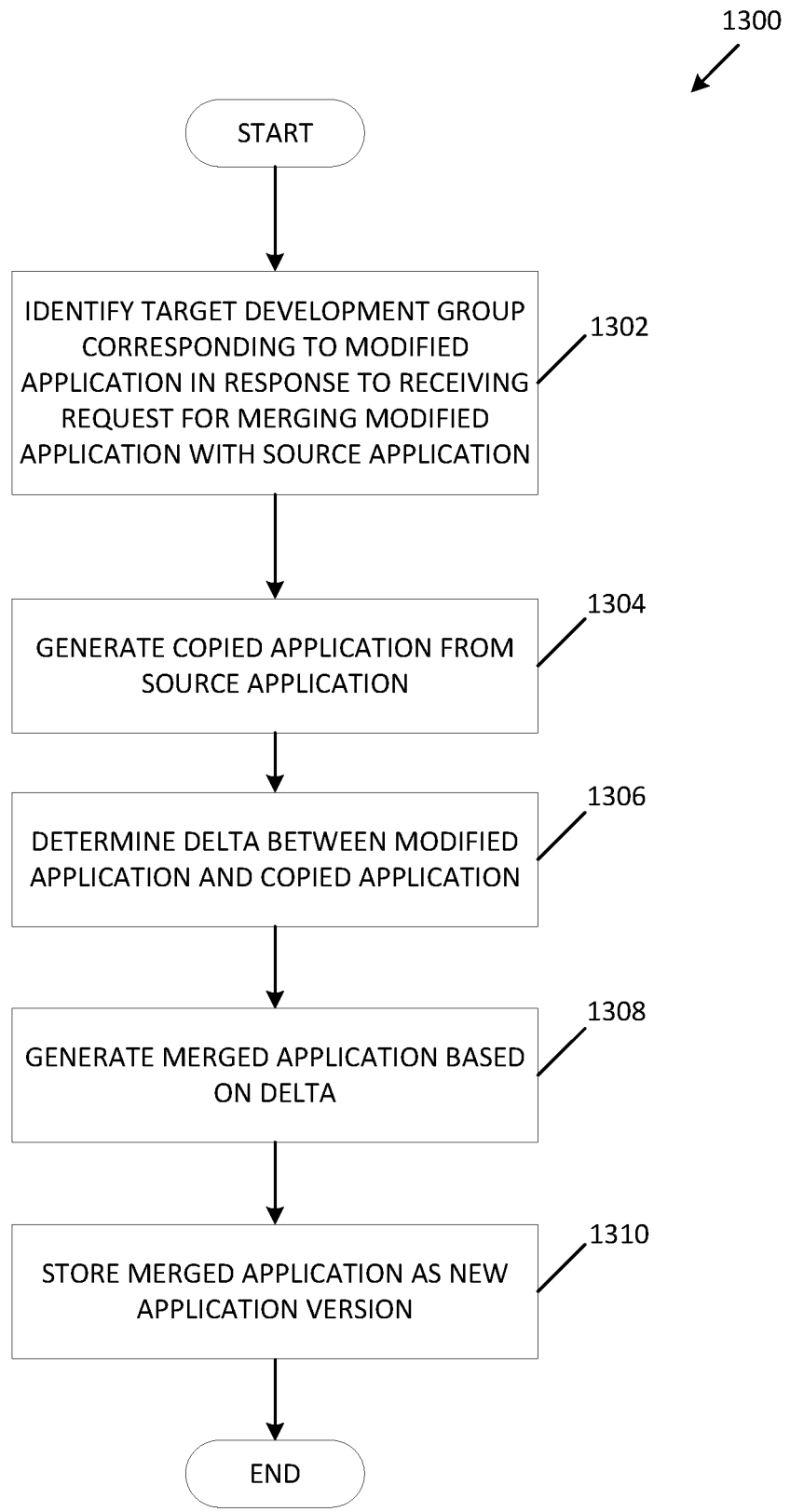
FIG. 13: EXEMPLARY APPLICATION MERGING PROCESS

APPLICATION REPOSITORY PROTOCOL FOR DISPARATE ENTITY APPLICATIONS

CROSS REFERENCE TO RELATED APPLICATIONS

This patent application is a continuation in-part application and claims the benefit of, and priority to, U.S. Non-Provisional patent application Ser. No. 16/399,384, filed on Apr. 30, 2019, and entitled "TRANSPORT PROTOCOL FOR DISPARATE ENTITY APPLICATIONS," which claims the benefit of, and priority to, U.S. Provisional Patent App. No. 62/691,380, filed on Jun. 28, 2018, and entitled "TRANSPORT PROTOCOL FOR DISPARATE ENTITY APPLICATIONS," the disclosures of which are incorporated by reference in their entireties as if the same were fully set forth herein.

TECHNICAL FIELD

The present disclosure relates generally to application management and versioning, and more particularly to unique systems and methods for application merging for facilitating application versioning between collaborative process systems.

BACKGROUND

Process collaboration is a common practice in many industries ranging from construction management to software programming. Conventional process collaboration systems and methods, such as those used by Dropbox and Box, implement a centralized solution where one party, or entity, owns and manages data and collaborating parties merely access the data from the centralized data owner. Collaborating parties may copy data from the centralized data owner to include in their own databases, but this process is cumbersome and requires frequent, and often manual, updates to remain current with the centralized data owner. Not only is the typical centralized solution inefficient with respect to version control, but also the lack of data ownership by each participating party limits that party's ability to establish integrated supporting systems for streamlining other process aspects. For example, participating parties may not be able to accurately develop internal processes based on the data stored at the centralized database, or it may be burdensome to do so.

Furthermore, while collaborating parties may copy data from a centralized data owner for including the data in their own databases, these parties generally will modify the data in some capacity (e.g., developing new application versions, or the like) without the ability to communicate the changes back to the entity/party from which the data was copied, or to combine changes to a particular application with another entity/party to generate a collaboratively-developed application.

Therefore, there exists a long-felt but unresolved need for systems and methods that allow for process collaboration where each participating party maintains its own data, and furthermore for systems and methods that allow for application merging between separate entities or development parties.

BRIEF SUMMARY OF THE DISCLOSURE

The present systems and methods relate generally to application management and versioning, and more particularly to unique systems and methods for merging application data for generating new application versions in separate processes.

According to various aspects of the present disclosure, the present systems and methods allow for a plurality of organizations to collaborate in processes, where each process and the data included therein is owned, controlled, and maintained by a separate organization. Furthermore, and according to one embodiment, a transport directive may facilitate the process collaboration between the organizations via one or more protocols or methods. In a particular embodiment, the transport directive includes updating one or more pointers within documents in processes in response to particular actions at the plurality of organizations. For example, consider two organizations, Organization A and Organization B, which are collaborating on a construction project. In this example, Organization A and Organization B may rely on the same information, or information that is substantially similar, but neither Organization A nor Organization B is a sole controller of the data for the construction project. Rather, Organization A and Organization B may both share relevant project data so that neither organization relinquishes ownership of data, and each organization may maintain their individual processes as preferred by each organization. Continuing with this example, consider a scenario where an RFI (request for information) document is to be sent from Organization A to Organization B. In one embodiment, sending an RFI document from Organization A to Organization B may leverage the transport directive, where the transport directive may allow for a user of the system to determine the particular location within the Organization B for which to send the RFI document. According to various aspects of the present disclosure, sending an RFI document from Organization A to Organization B may generate (via the transport directive and/or a process engine) a separate RFI document in Organization B that is mapped to and collaborative with the RFI document from Organization A. In this way, Organization A's RFI document is maintained and controlled by Organization A, and Organization B is operable to collaborate on the document via pointers within the document that provide awareness to the collaborating organizations regarding the status of the collaboration, the location of the document(s), and the target for the next step of collaboration.

Furthermore, the present systems and methods allow for management and versioning of applications via an application repository. In one embodiment, the application repository includes one or more servers and databases for storing a plurality of process applications which may be developed independently and internally by organizations, but may also be shared across organizations or parties. According to various aspects of the present disclosure, as a particular application is developed or modified over time, the application repository facilitates versioning of that application by merging source applications with modified applications to generate new application versions that are saved within the application repository in association with the organizations or development groups to which the applications pertain.

In one embodiment, the present disclosure discusses a system including: an application versioning database comprising a repository of one or more applications, wherein each application corresponds to a particular development group within the application versioning database, and wherein each particular development group comprises a sandboxed computing environment accessible to permissioned application developers and users; a mapping database for storing data mapped between a plurality of development groups, wherein the mapped data corresponds at least to permissions defining access rights to the one or more applications associated with the plurality of development groups; and at least one server comprising one or more processors, the at least one server operatively connected to the application versioning database and the mapping database, the at least one server configured for: upon receiving a request for merging a modified application with a source application in a source development group, identifying a target development group corresponding to the modified application; generating a copied application from the source application; transmitting the copied application to the target development group; determining a delta between the modified application and the copied application, wherein the delta comprises development changes between the modified application and the copied application; and generating a merged application comprising the copied application and at least a portion of the delta.

In a particular embodiment, the merged application is denoted as a new version in the target development group. In various embodiments, determining the delta includes comparing the modified application to the copied application for differences in the application coding. In certain embodiments, the at least one server is further configured for transmitting the merged application to the source development group for indicting the merged application as an updated application version. In at least one embodiment, the at least one server is further configured for transmitting the merged application to the source development group according to a predetermined time interval. According to various aspects of the present embodiment, the at least one server is further configured for transmitting the merged application to one or more additional development groups, wherein the one or more additional development groups include copies or versions of the source application. In certain embodiments, the access rights comprise permissions for downloading from and uploading application versions to each of the plurality of development groups.

In various embodiments, the present disclosure discusses an application versioning process comprising: providing at least one server comprising one or more processors, the at least one server operatively connected to an application versioning database and a mapping database, wherein the application versioning database comprises a repository of one or more applications, each application corresponding to a particular development group within the application versioning database, and wherein each particular development group comprises a sandboxed computing environment accessible to permissioned application developers and users, and wherein the mapping database stores data mapped between a plurality of development groups, wherein the mapped data corresponds at least to permissions defining access rights to the one or more applications associated with the plurality of development groups, wherein the at least one server is configured for: upon receiving a request at a server for merging a modified application with a source application in a source development group, identifying a target development group corresponding to the modified application; generating a copied application from the source application; transmitting the copied application to the target development group; determining a delta between the modified application and the copied application, wherein the delta comprises development changes between the modified application and the copied application; and generating a merged application comprising the copied application and at least a portion of the delta.

In various embodiments, the merged application is denoted as a new version in the target development group. In certain embodiments, determining the delta comprises comparing the modified application to the copied application for differences in the application coding. In a particular embodiment, the at least one server is further configured for transmitting the merged application to the source development group for indicting the merged application as an updated application version. In at least one embodiment, the at least one server is further configured for transmitting the merged application to the source development group according to a predetermined time interval. According to various aspects of the present disclosure, the at least one server is further configured for transmitting the merged application to one or more additional development groups, wherein the one or more additional development groups include copies or versions of the source application. In various embodiments, the access rights comprise permissions for downloading from and uploading application versions to each of the plurality of development groups.

These and other aspects, features, and benefits of the claimed systems and methods will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 1 is a diagram of an exemplary process collaboration system, according to one aspect of the present disclosure;

FIG. 2 is a diagram of an exemplary network directory, according to one aspect of the present disclosure;

FIG. 3 is a diagram illustrating exemplary network directory functionality, according to one aspect of the present disclosure;

FIG. 4 is a diagram illustrating exemplary project mapping functionality, according to one aspect of the present disclosure;

FIG. 5 is a diagram of an exemplary application repository, according to one aspect of the present disclosure;

FIG. 6 is an exemplary application hierarchy, according to one aspect of the present disclosure;

FIG. 7 is a diagram illustrating an exemplary transport enabled process sequence, according to one aspect of the present disclosure;

FIG. 8 is a flowchart illustrating an exemplary transport directive process, according to one aspect of the present disclosure;

FIG. 9 is a diagram illustrating an exemplary project mapping process, according to one aspect of the present disclosure;

FIG. 10 is a flowchart illustrating an exemplary deferred transport execution process, according to one aspect of the present disclosure;

FIG. 11 is a diagram illustrating an exemplary remote transport directive process, according to one aspect of the present disclosure;

FIG. 12 is a diagram of exemplary application repository functionality, according to one aspect of the present disclosure; and FIG. 13 is a flowchart illustrating exemplary application repository functionality, according to one aspect of the present disclosure.

DETAILED DESCRIPTION OF FIGURES

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Overview

According to various aspects of the present disclosure, the present systems and methods allow for a plurality of organizations to collaborate in processes (e.g., workflows), where each process and the data included therein is owned, controlled, and maintained by a separate organization. Furthermore, and according to one embodiment, a transport directive may facilitate the process collaboration between the organizations via one or more protocols or methods. In a particular embodiment, the transport directive includes updating one or more pointers within documents in processes in response to particular actions at the plurality of organizations. For example, consider two organizations, Organization A and Organization B, which are collaborating on a construction project. In this example, Organization A and Organization B may rely on the same information, or information that is substantially similar, but neither Organization A nor Organization B is a sole controller of the data for the construction project. Rather, Organization A and Organization B may both share relevant project data so that neither organization relinquishes ownership of data, and each organization may maintain their individual processes as preferred by each organization. Continuing with this example, consider a scenario where an RFI (request for information) document is to be sent from Organization A to Organization B. In one embodiment, sending an RFI document from Organization A to Organization B may leverage the transport directive, where the transport directive may allow for a user of the system to determine the particular location within the Organization B for which to send the RFI document. According to various aspects of the present disclosure, sending an RFI document from Organization A to Organization B may generate (via the transport directive and/or a process/workflow engine) a separate RFI document in Organization B that is mapped to and collaborative with the RFI document from Organization A. In this way, Organization A's RFI document is maintained and controlled by Organization A, and Organization B is operable to collaborate on the document via pointers within the document that provide awareness to the collaborating organizations regarding the status of the collaboration, the location of the document(s), and the target for the next step of collaboration.

Furthermore, the present systems and methods allow for management and versioning of applications via an application repository. In one embodiment, the application repository includes one or more servers and databases for storing a plurality of process applications which may be developed independently and internally by organizations, but may also be shared across organizations or parties. According to various aspects of the present disclosure, as a particular application is developed or modified over time, the application repository facilitates versioning of that application by merging source applications with modified applications to generate new application versions that are saved within the application repository in association with the organizations or development groups to which the applications pertain.

Exemplary System and Network

Referring now to the figures, FIG. 1 is a diagram of an exemplary process collaboration system 100, according to one aspect of the present disclosure. The system 100 illustrated in the present embodiment is a collaborative network of computing components including servers, databases, mobile computing devices, desktop computers, and other processing devices. In various embodiments, these components may be local to one physical location (e.g., a particular organization property) or they may be remote and/or distributed (e.g., the computing components are owned by different organizations, are shared between various entities, are physically located at separate locations, etc.) via operative connections to communication networks such as the internet. According to various aspects of the present disclosure, the system 100 allows for companies, or organizations in general, to collaborate with other companies in processes included in projects that are relevant to both parties, while each collaborating company may maintain ownership and control of the data relevant to its own process.

For example, a general contractor and a subcontractor may both be working to complete a project involving constructing a new apartment complex. In this example, the tasks of both the general contractor and the subcontractor may be outlined or organized in processes according to their respective preferred formats, where both the general contractor and the subcontractor each have separate processes including applications with unique tasks that define the processes, however, the general contractor's process may rely upon completion of a task in the subcontractor's process. According to various aspects of the present disclosure, the system 100 allows for data relating to a task or event completed or initiated by the subcontractor to be communicated to the general contractor for either inserting the data into the general contractor's process, updating a document within the general contractor's process to include the relevant data, or updating a pointer to point to the new relevant process information.

Continuing with FIG. 1, the system 100 shown in the present embodiment includes a collaborative network 102 representative of a computing environment allowing a plurality of entities to collaborate on one or more processes. In one embodiment, the collaborative network 102 includes an organization site 104A (e.g., a subcontractor) and an organization site 104B (e.g., a general contractor). In various embodiments, the organization sites 104A and 104B are separate sites within the collaborative network 102, however, the architecture and functionality of the collaborative network 102 allows for the organization sites 104A and 104B to transmit, receive, and generally share data as necessary without sacrificing ownership and control of the data. It should be understood that any number of organization sites may be included within the collaborative network 102.

In various embodiments, and referring particularly to the organization site 104A, the organization site 104A includes a company and contact directory database 106A for storing data relating to the organization's members, administrators, employees, contacts, etc., and their respective information (e.g., active projects/tasks, contact information, permissions settings, etc.). In particular embodiments, also included in the organization site 104A is project data 108A relating to the organization's active or completed projects, and the process data 110A corresponding to the project data 108A. According to various aspects of the present disclosure, the project data 108A many include one or more processes from the process data 110A.

Continuing with FIG. 1, the organization site 104B shown in the present embodiment includes a similar structure to the organization site 104A in that the organization site 104B includes a company and contact directory 106B, as well as project data 108 and process data 110B. In particular embodiments, the data structures included at both the organization site 104A and organization site 104B are similar, or substantially the same, so that the organization sites may share data for process collaboration without the need to change data formats.

In one embodiment, the functionality for sharing data between the organization sites in the collaboration network 102 is executed by a transport directive 112. As shown in the present embodiment, the transport directive 112 is represented as a dashed box encompassing various data structures and computing components (to be described herein), as well as data being transmitted, or "transported," between the organization sites via the computing components (represented as bi-directional arrows/links). According to various aspects of the present disclosure, the transport directive 112 is a method, system, and/or protocol for transporting data between the organization sites 104A and 104B, generating and maintaining a record of pointers for tracking relationships between the organization sites 104A and 104B, synchronizing shared data, etc. Aspects of the transport directive 112 will be described in further detail below in the discussion of FIG. 7.

In various embodiments, the data structures and computing components accessible by the transport directive 112 include a network directory 114, a project mapping database 116, an application repository 118, and a process/workflow engine 120. According to various aspects of the present disclosure, the network directory 114 is a database or similar data structure for storing records of company and employee profiles, as well as the "relational" relationships corresponding to those companies and employees. For example, the organization site 104A may maintain its own company and employee contact information in the company and contact directory 106A, however, the transport directive 112 may mirror the company and contact directory 106A to correspond to the network directory 114, or vice versa. Including a mirrored copy of the company and contact directory 106A at the network directory 114 allows for other organizations, such as the organization site 104B, to access copies of (or pointers to) the contact data of the organization site 104A without the site 104A relinquishing control of its data.

In a particular embodiment, the project mapping database 116 includes data, such as pointers, relating projects between disparate organizations or entities within processes at those organizations. For example, the project mapping database 116 may include data representing a link from a project within the organization site 106A to the same project shared within the organization site 106B. In one embodiment, the system 100 also includes an application ("app") repository 118. In certain embodiments, the application repository 118 stores various applications that may be installed on organization sites during an initial registration period. In particular embodiments, additional applications may be installed after the registration of organization sites. Furthermore, in various embodiments, the transport directive 112 may leverage a process engine 120 for executing transport processes between projects and processes. In a particular embodiment, the process engine 120 may be any computing device including a processor that is operable to facilitate electronic communication between the organization sites 104A and 104B.

Turning now to FIG. 2, a diagram of the exemplary network directory 114 is shown, according to one aspect of the present disclosure. As shown in the present embodiment, the network directory 114 is operatively connected to the organization site 104A and organization site 104B, the operative connection represented as one or more bi-directional arrows. According to various embodiments, the bi-directional arrows shown represent links between the network directory 114 and the organization site 104A and organization site 104B. As will be discussed in greater detail herein, these bi-directional links may be pointers stored in relational databases (e.g., the network directory database 114), and the pointers may "point to" locations in memory where the organization site information, employee contact information, process information, etc., is stored. In various embodiments, the network directory 114 includes a registry of all registered organizations and organization sites within the collaborative network 102, as well as the registered employees associated with the organizations. For example, included within the network directory 114, in the present embodiment, is a Company A profile 202A and a Company B profile 202B, and these profiles correspond to local profiles (Company A 204A and Company B 204B) at their respective organization sites.

In certain embodiments, during registration with the collaborative network 102, a user may associate with an existing organization site as an employee, or register a new organization. For example, referring to the organization site 104A in the present embodiment, Employee A2 206 is associated with a Company A 202. Furthermore, and in particular embodiments, registering an employee with a particular organization site may trigger the creation of a corresponding employee profile within the network directory 114, such as the Employee A2 profile 208 which points to the Employee A2 206 profile. In particular embodiments, associating with a preexisting organization during registration may require approval by the organization (e.g., an administrator at the organization).

In one embodiment, when a new organization is registered, a public (or private) profile is created for the organization in the network directory 114. In certain embodiments, when a new employee registers, a public profile may be generated for including the new employee in the network directory 114. According to various aspects of the present disclosure, other organizations may add public organization/company profiles, as well as any of its associated public employee profiles, from the network directory 114 to their site. For example, and as shown in the present embodiment, the organization site 104B includes a public copy of the Company A profile, indicated as 210. According to various aspects of the present disclosure, changes made to the Company A profile 202A at the network directory 114 may be transmitted to the public copy 210 at the organization site 104B, however, activity at the organization site 104B may not result in a reciprocal change to the data at the Company A profile 202A.

Continuing with FIG. 2, if a contact is added to a particular company site, such as the Contact A1 212 added at the organization site 104A, the addition of this contact may result in the generation of corresponding profiles at the network directory 114 and other organization sites, such as the Employee A1 profile 214 at the network directory 114 and the Contact A1 216 at the organization site 104B.

In particular embodiments, the process of adding any company or employee profile to an organization's site may create a link between the network directory company or employee profile and the local company or contact entities. According to various aspects of the present disclosure, the links between the network directory company or employee profile and the local company or contact entities are bi-directional and are stored as records in multiple relational databases. In various embodiments, one set of links are stored in the network directory 114 and represents the pointers between the company and employee profiles and the local companies and contacts. In some embodiments, the other set of links may be stored in the databases for each company site, which represent the pointers between the local companies and contacts and their corresponding network directory 114 counterparts. In some embodiments, whenever changes are made by an organization to their network directory company profile (such as the Company A profile 202A), those changes are synchronized down to all local company entities that are linked to their network directory company profile (such as Company A 204A and Company A 210). In certain embodiments, whenever a company employee makes a change to their network directory profile, all changes are synchronized down to all local contact entities that are linked to their network directory employee profile. According to various aspects of the present disclosure, organizations may control the visibility of their company and employee profiles in the network directory by changing the visibility setting of their profile from public to private.

In one embodiment, employees can control the visibility of their employee profile in the network directory 114 by changing the visibility setting of their profile from public to private. For example, the Company A profile 202A and Employee A1 profile 214 are both indicated as public profiles, thereby allowing organization site 104B to include local copies of these profiles, however, the Company B 204B at the organization site 104B as well as the Company B profile 202B at the network directory 114 are both private, and thereby are not accessible by the organization site 104A. In certain embodiments, the privacy settings of these profiles may extend downward to the associated profiles, such as the Contact B1 218 and the Employee B1 profile 220.

In various embodiments, when a new organization is registered, a site (e.g., organization site 104A) is created within the collaborative network 102 specifically for that organization. Furthermore, and according to particular embodiments, once a site is created, applications from the application repository 118 can be installed onto the organization site and the collaboration process can begin. In certain embodiments, each organization site may be operatively connected to a local application repository for storing the installed applications from the application repository 118.

FIG. 3 is a diagram illustrating an exemplary network directory linking functionality, according to one aspect of the present disclosure. In various embodiments, the network directory 114 is a relational database structure for managing links, or pointers, between data stored at the network directory 114 and data stored local to an organization's site, such as the organization site 104A. In at least one embodiment, the network directory 114 synchronizes data including, but not limited to, employee profiles, linked local company information, and contact entities in the organization sites.

As shown in the present embodiment, the network directory 114 company entity 302 and contact entity 304 may both include a one-to-many attribute, such as the CommunityLinkedEntities attribute. According to various aspects of the present disclosure, the CommuinityLinkedEntities attribute may include a collection of pointers to a local company entity 306 and a local contact entity 308 located on the organization site 104A. In particular embodiments, the one to many attributes are persisted in a relational database table (referred to herein as "EntityLink") including the links between two entities, such as the company entity 302 and the company entity 306. In certain embodiments, as new links are made, additional records are created in the EntityLink table. In particular embodiments, local company and contact entities include a separate attribute, such as the CommunityEntity attribute shown in the present embodiment, which points back to the linked company or contact entity in the network directory 114. According to various aspects of the present disclosure, these links or pointers are created during an entity registration process. In one embodiment, these pointers are persisted as relational records in the EntityLink tables. In certain embodiments, the pointers at the local sites, such as the organization site 104A, have a cardinality of one to one because each local company and contact may only point to one entity in the network directory 114. In particular embodiments, each organization can control the visibility of their company and employee information in the network directory 114 by toggling an "IsPublished" attribute, or similar privacy setting attribute, on their company or employee profiles.

According to various aspects of the present disclosure, the pointers between the local entities within an organization site, such as the organization site 104A, and the network directory 114 may be facilitated or organized according to primary keys and foreign keys assigned to each of the attributes. For example, a "primary" or global entity may have associated with it one or more entities that point, or refer, back to the primary entity via a primary key corresponding to the primary entity. Furthermore, the entities pointing back to the primary entity may include foreign keys, which may be stored in a relational database and allow for any changes at the primary entity to be transmitted or synchronized to the entities associated with the foreign keys.

Continuing with FIG. 3, a synchronization process is used to propagate changes from the network directory entities to their linked local entities using the bi-directional links, according to various embodiments. In particular embodiments, when changes to a network entity company (such as the company 302) or contact have been successfully synchronized down to their linked local company (company 306) or contact entities, an "IsInSyncWithCommunity" attribute is set, or a similar attribute for indicating updates.

Turning now to FIG. 4, a diagram illustrating exemplary project mapping functionality is shown, according to one aspect of the present disclosure. In various embodiments, projects are used to group documents (such as an RFI document) within an organization's site. In particular embodiments, when two or more organizations wish to collaborate on the same project, a mapping may be established between the two sites. For example, a first organization (e.g., the organization site 104A) may initiate the project mapping by transmitting a task to a second organization (e.g., the organization site 104B), requesting the second organization to accept and complete the mapping. In one embodiment, to complete the mapping, the second organization may specify or create a substantially similar project on their site.

As illustrated in the present embodiment, the organization site 104A includes a local Project A 402 and transmits a request for collaboration to the organization site 104B, which may include accepting a copy of the Project A, indicated as 404. In various embodiments, once the second organization identifies/accepts the target project (e.g., Project A 404), the mapping can be established. According to various aspects of the present disclosure, once projects have been mapped between organizations, documents can be transferred or transported from one organization to another, regardless of application, without user intervention. In particular embodiments, for an organization to complete a project mapping, a user at the source organization may be required to browse and select a project on the organization site. In response to identifying a target project, pointers are created on both the source and target organization sites, thereby linking the projects in a bi-directional fashion. According to various aspects of the present disclosure, these pointers are illustrated in the present embodiment at the projects 406A and 406B, and their respective project mappings at 408A and 408B.

In one embodiment, in response to completing the project mapping, the organization site 104A includes a mapped project 406A and the associated project mappings 408A. In various embodiments, the associated project mappings 408A include pointers such as a source project pointer 410A, a target domain 412A, and a target project 414A. According to various aspects of the present disclosure, the source project pointer 410A points to the project at the organization site 104A (the project 406A or a corresponding project ID) and the target domain 412A and target project 414A point to locations within the organization site B, according to the mapping configurations. In particular embodiments, the target domain pointer 412A may point to a particular location in memory (such as a directory, folder, data structure, etc.) at the organization site 104B (or network directory 114), and the target project 414A may point to the mapped project 406B (or a corresponding project ID) within the organization site 104B.

Continuing with FIG. 4, the mapped project 406B at the organization site 104B includes associated mappings, such as a target project 410B, a source domain 412B, and a source project 414B. In one embodiment, the target project 410B may point to the mapped project 406B, just as the target project 414A does, because the project 406B is the target for the mapping according to the present embodiment. According to various aspects of the present disclosure, the source domain 412B and source project 414B point back to the project 406A at the organization site 104A, as the project 406A initiated the mapping and is thus the source.

FIG. 5 is a diagram illustrating an exemplary application repository 118, according to one aspect of the present disclosure. In various embodiments, the application repository 118 includes a registry of all applications that have been developed for the collaborative network 102. In particular embodiments, the application repository 118 may include both public and private applications. In certain embodiments, public applications are accessible via an application store (e.g., a front end UI available to a system 100 user) and can be installed on any organization site by a user with appropriate permissions. In some embodiments, private applications are developed for a specific organization and are not visible in the application store. According to various aspects of the present disclosure, once an application is installed on an organization site, access to the application can be granted to users on that site by a site administrator.

As shown in the present embodiment, the application repository 118 includes two applications: a public RFI application 502, and a private custom application X 504. According to various aspects of the present disclosure, the public RFI application 502 may be installed at both the organization site 104A and the organization site 104B, as shown by the RFI applications 506A and 506B in the present embodiment. In particular embodiments, the private custom X 504 application is privately configured for the organization site 104A, and instances of this application may be installed at the application site 104A, indicated as 508 in the present embodiment.

Referring now to FIG. 6, an exemplary application hierarchy 600 is shown, according to one aspect of the present disclosure. In particular embodiments, the application hierarchy 600 may outline a structure for how data relating to applications in the system 100 is to be organized or stored (e.g., as an XML document in the application repository). In various embodiments, at the top of the application hierarchy is an application definition 602. In one embodiment, the application definition 602 defines the type of application and also may allow for memory to be reserved for instantiating attributes or parameters of the application hierarchy.

In various embodiments, an application or application definition 602 may include one or more entity definitions 604 that describe documents managed by the application. In one embodiment, each entity definition 604 includes a collection of attributes 606 that describe the fields (e.g., predetermined areas for text/data, instantiated parameters, metadata, etc.) of the document, and each attribute 606 may include a name and data type property. Examples of attribute 606 data types may include: text, date\time, boolean, file, and entity. In some embodiments, attributes 606 with a data type of "entity" are used to create relationships between other entities. In certain embodiments, entity attributes 606 include an additional cardinality property with values of one-to-one or one-to-many. For example, an entity attribute 606 may be a "To Contact" attribute on an RFI entity that includes a pointer to a "Contact" entity in a separate RFI.

Continuing with FIG. 6, in some embodiments, an application may include one or more process definitions 608. In various embodiments, when a document is created within an application, it is subsequently inserted into a process. In particular embodiments, each process definition 608 includes a collection of steps 610 representative of the various states of the process. Furthermore, each step 610 may include a set of commands 612 that determine what actions can be performed on a document in particular steps 610.

In some embodiments, each step command 612 may include a set of command actors 614 that dictate which users can invoke the command 612, and also command directives 616 for determining the action or outcome when a particular command is invoked. Examples command directives 616 may include: Task, StepTo, Message, Map, Assertion, Event, and Transport. According to various aspects of the present disclosure, each process step 610 may include a collection of task definitions 618 for creating tasks using the task command directive 616.

According to various aspects of the present disclosure, command actors 614 are defined for each process definition 608 and can be one of two types: Attributes and Roles. In one embodiment, an attribute based actor is used to resolve a process actor to the contact stored in a specific field (attribute) on a document. For example, an RFI document may include an attribute called "Primary Responder." In this example, the RFI process has an attribute based actor that is associated with the Primary Responder attribute. This attribute based actor can be used to create a process task for the contact stored in the Primary Responder attribute at certain points in the RFI process. In one embodiment, a Role based actor is used to resolve process actors to one or more contacts that are associated with a specific role. For example, the RFI process has a Role based actor that is associated with the Administrator role at the organization site level. In some embodiments, when this actor is used within the process (for example, granting access to a high level action like recalling a process) any users that belong to that Role will have access to that action.

In particular embodiments, similar to the command actors 614 for determining the permissions or scope of action a particular user may reserve for each step command 612, the application definition 602 in general may include a roles attribute 620 for determining the permissions, scope of action, or general accessibility or responsibility of the owner of the application or application definition 602.

Exemplary Transport Process and Processes

FIG. 7 is a diagram illustrating an exemplary transport enabled process sequence, according to one aspect of the present disclosure. In various embodiments, the exemplary transport enabled process sequence allows for organization sites, such as the organization site 104A and organization site 104B, to share data and collaborate on project processes without sacrificing ownership of each sites respective data. In one embodiment, a subcontractor (e.g., the organization site 104A) may create a new RFI document including the following attributes: "Subject" and "ToContact". In response to saving the RFI document within the organization site 104A, the RFI document may be inserted into a "Draft" step 702 within the subcontractor process. According to various aspects of the present disclosure, the "Draft" step 702 indicates that an RFI document, or other document, has been created via a particular organization site, but has not yet been submitted to other organization sites for collaboration. In various embodiments, the "ToContact" attribute of the RFI document is a pointer to a community contact at the organization site 104B and will be used to determine the recipient of the RFI document when it is submitted for review (e.g., the ToContact pointer references the particular location in memory where the RFI recipient contact resides). In one embodiment, the subcontractor may submit the RFI document at step 704 to the general contractor (e.g., the organization site B 104B) by transmitting the RFI document to the location in memory derived from the pointer represented by the ToContact attribute. According to various aspects of the present disclosure, the RFI document is submitted via the transport directive. In response to transmitting this RFI document, the transport directive may be used to initiate a project mapping sub-process 706. In particular embodiments, the project mapping sub-process 706 may require the recipient of the RFI document to map the incoming request to a project on its respective site before proceeding with the transport enabled sequence.

In response to completing the project mapping sub-process, a new RFI document representative of the subcontractor RFI document is created (sub-RFI) at the general contractor's site and is received at the step 708. According to various aspects of the present disclosure, at the step 708, two instances of the subcontractor RFI document data exist within the system 100, however, the instances of the data are within separate but complimentary processes (the subcontractor process and the general contractor process). In various embodiments, at the step 708, the general contractor may return the sub-RFI at step 710, or acknowledge and review the sub-RFI at step 712. In one embodiment, if the sub-RFI is returned at step 710, the source pointer of the sub-RFI is updated to reflect this new location in memory (the "Returned" step in the general contractor process), thereby allowing the subcontractor to access the data from the returned sub-RFI. In one embodiment, if the general contractor acknowledges and reviews the sub-RFI at step 712, the general contractor may update the source pointer of the sub-RFI to indicate that the sub-RFI is located at the "in review" step 712. Furthermore, and in response to the general contractor updating the source pointer at step 712, a separate transport call is made to transition the original RFI document in the subcontractor process to the corresponding "In Review" step 714 at the subcontractor site. According to various aspects of the present disclosure, a response from the general contractor relating to the sub-RFI may result in the sub-RFI being transitioned to the "Responded" step 716, which may include executing a transport directive call to update the source pointer of the sub-RFI to indicate this new state. In certain embodiments, a separate transport directive call may initiate the transition of the original RFI from the "In Review" step 714 to the "Responded" step 718 within the subcontractor site.

FIG. 8 is a flowchart illustrating an exemplary transport directive process, according to one aspect of the present disclosure. In particular embodiments, the transport directive is a method or protocol for managing the translation or transporting of data within the system 100. In one embodiment, in order to initiate the transport directive, the target organization site to receive data via the transport directive must be resolved, or determined, as shown in the present embodiment at step 802. In various embodiments, documents within processes in the system 100 may include parameters and attributes, such as a "Target Company" parameter and "ToContactCompany" attribute, which may identify the target organization site for a particular transport directive action. According to various aspects of the present disclosure, the "Target Company" parameter may include a pointer to particular organization site for translating data to the particular organization, and the "ToContactCompany" may indicate a particular employee or contact within the targeted company/organization to receive the transport directive action. Furthermore, in particular embodiments, these parameters and attributes may include pointers, such as a "CommunityEntity" pointer, for pointing to the target company within the network directory 114.

In one embodiment, at step 804 in the exemplary transport directive process, the system 100 resolves the target entity within the target organization site. According to various aspects of the present disclosure, the system 100 may resolve the target entity by determining a particular location in a process at the target organization site for transporting data to via the transport directive. In particular embodiments, the document to be transported via the transport directive may include one or more "Target" and "Source" entities, which are pointers for determining where the document is to be transported to, and where it is being transported from.

For the sake of clarity and understanding, consider an example where the target and source entities are similar to mailing addresses and return addresses. When mailing an envelope, the mailing address (where the envelope is intended to be sent) may resemble the target entity pointer, and the return address (where the envelope was sent from) may resemble the source entity pointer. In response to the envelope being received at the mailing address, and assuming a response envelope may be sent in the future, the mailing address and return address are swapped (e.g., the original mailing address may now be listed as the return address, etc.). According to various aspects of the present disclosure, if an organization site within the system 100, such as the organization site 104A, includes an RFI document initially received from the organization site 104B, the target entity pointer of the RFI document may point back to the organization site 104B in order to return the RFI.

In various embodiments, when a transport directive action is executed, both the source and target entities are updated with source and target pointers. According to various aspects of the present disclosure, the source entity of the transport document may include a collection of transport "Targets" that indicate the entities the transport document may have been received from. In various embodiments, the target entities of the transport document have a transport "Source" that is updated to indicate the receiving entity. In certain embodiments, if the Target Source parameter is a target and there are no prior transports from the source document (Source Document parameter) to the target organization site, then the target entity will be a new entity. If the Target/Source parameter is a target and a prior transport Target exists for the source document to the target organization site, then the target entity will be the Target of the prior transport to that site. In particular embodiments, if the Target\Source parameter is a source, then the target entity will be transport Source of the source document (Source Document parameter).

At step 806, the system 100 determines if project mapping is required to execute the transport directive action, according to one embodiment. In various embodiments, project mapping allows for one organization site to establish a link with another organization site for collaborating on processes. However, in some embodiments, transport directives may be executed that do not translate data to other organization sites, but rather the transport directive operates on data within the scope of one site alone. According to various aspects of the present disclosure, if it is determined that project mapping is required to execute the transport directive (e.g., the transport target points to an organization site other than the source organization site), then the system 100 may determine if a project mapping already has been established at step 808. In one embodiment, if a project mapping has already been established, a parameter within the document at the target entity may include a pointer relating to a "Source Document," and this pointer will reference the source entity if a mapping has been established. If the system determines that a mapping has not yet been established, the system 100 may proceed to a project mapping process 900 to establish the mapping requirements. The exemplary project mapping process 900 is described in greater detail below in the discussion of FIG. 9.

In various embodiments, if the system determines at step 806 that a project mapping was not required to execute the transport directive, or a project mapping was required and the project mapping has already been established, the exemplary transport directive process may proceed to the compose target entity step 810.

At step 810 of the exemplary transport directive process, if a target entity has not been identified using the Target\Source parameter as described above in the step 804, then a new target entity will be composed. According to various aspects of the present disclosure, the type of this new target entity is determined by the "Target Entity Definition" parameter of the transported document. In one embodiment, an Entity Definition (see 604 in FIG. 6), such as an RFI document, defines the attributes (i.e. fields) for entities of that type. If a target entity has been identified via the Target\Source option, then the activities in this step may apply to the identified target entity.

In various embodiments, and continuing with step 810, if the transport directive has a field mapping specified in the "Mappings" parameter, the field mapping is executed using the source and target entities. In particular embodiments, a field mapping includes a collection of From\To attribute name pairs. In certain embodiments, when the mapping is executed the From\To attribute pairs are evaluated and the value of the "From" attribute on the source entity is used to populate the "To" attribute on the target entity. In one embodiment, if the data types of the From\To attributes are the same, then no data conversion takes place. According to various aspects of the present disclosure, if the data types are different (i.e. From attribute is an Integer and the To attribute is a String), then a data conversion is executed via a data conversion operator (such as the ToString( ) operator if the To attribute type is a string), string parser (such as the TryParse( ) operator if the incoming/From attribute type is a string and the To attribute type is not a string), etc. In some embodiments, when more than one attribute is to be converted, such as more than one "Line Item" attributes in an "Invoice" entity, the more than one attributes may be converted recursively using the transport methods described herein.

In certain embodiments, if the data types are not compatible, an error occurs, and the transport fails. In particular embodiments, when the From attribute values are of type "Company" and "Contact" and have links to the network directory 114, then an attempt is made to set the "To" attribute on the target entity to a local Company or Contact on the target organization site that points to the same network directory Company or Contact. In various embodiments, if a local Company or Contact (that points to the network directory Company or Contact) is not found on the organization site, then the network directory Company or Contact is automatically added to the organization site and referenced on the target entity's To attribute.

According to various aspects of the present disclosure, if the transport directive has any assignments defined in the "Assignments" parameter, then the assignments may be executed on the target entity. In one embodiment, an assignment is used to set an attribute on the target entity to a specific value or empty\remove an attribute on the target entity. Examples of an assignment may include: a) set a "ReceivedDate" date attribute to the current date; b) set a "WasSubmitted" boolean attribute to true; and c) empty\remove a "ResponseDate" date attribute.

Proceeding now to step 812 of the exemplary transport directive process, after composing the target entity, the target entity may be persisted to the organization site identified at the beginning of the transport execution. In one embodiment, and prior to persisting the entity, the target process and the initial process step can be set using the Target "Process Definition" and "Start Step" parameter values. In various embodiments, the Process Definition parameter contains the name of the process definition (i.e. Subcontractor RFI Process) that the target entity will be enlisted in when it is persisted to the target organization site. In a particular embodiment, the Start Step parameter includes the name of the process step (i.e. Received) that the entity process will start in.

At step 814, in one embodiment, once the target entity has been persisted on the target organization site, a collection of pointers are persisted on both the source and target entities. In various embodiments, the pointers are used when the source and target entities are referenced in future transports and the Target\Source options are evaluated. In certain embodiments, a collection of transport target entity pointers are updated on the source entity when a source entity is transported to a target entity. According to various aspects of the present disclosure, these target pointers include the identifier for the target entity as well as an identifier for the target organization site. In one embodiment, the target entity may include a transport source pointer that points to the source transport entity used to create the target entity (during step 810). Like the target transport pointer, the source transport pointer includes the identifier for the source entity as well as an identifier for the source organization site.

Turning now to FIG. 9, an exemplary flowchart illustrating an exemplary project mapping process 900 is shown, according to one aspect of the present disclosure. As shown in the present embodiment, the project mapping process 900 may include an initiating site 902 and a target site 904, which may resemble the organization site 104A and organization site 104B described herein, respectively. According to various aspects of the present disclosure, the initiating site 902 may send a Project Mapping request, indicated as step 906, to the target site 904. In one embodiment, the Project Mapping request includes the name of the initiating company, the name of the company contact that initiated the request, the name of the incoming source project, and the application associated with the incoming request. In various embodiments, at step 908 a process task is created on the target site 904 that allows a user on the target site 904 to accept or decline the mapping request. In a particular embodiment, at step 910 if the project mapping request is declined, an optional process event 912 is invoked on the process at the initiating site 902. In certain embodiments, this event is typically used for sending notification messages and changing the state of the initiating process. In one embodiment, to accept the project mapping request at step 910, a target project on the target site 904 may be selected.

According to various aspects of the present disclosure, selecting a target project may include selecting an existing project or creating a new project at step 914. In response to selecting a target project, the project mapping request may be accepted. In response to accepting the project mapping request at step 914, the system updates the project maps on both the initiating site 902 and the target site 904. In one embodiment, the incoming project map is updated first on the target site 904, indicated as step 916 in the present embodiment. In particular embodiments, for each mapped incoming project, the incoming partition map includes an identifier for the source site and project as well as an identifier for the mapped (target) project. In various embodiments, the outgoing partition map is updated on the initiating site 902 after the target site 904 is updated, indicated as step 918. In certain embodiments, for each mapped outgoing project, the outgoing partition map includes an identifier for the source project as well as identifiers for the target site 904 and project. According to various aspects of the present disclosure, and in response to the project maps being updated on both the initiating and target sites, the transport directive may resume execution at step 920, and transfer the document(s).

Turning now to FIG. 10, a flowchart of an exemplary deferred transport execution process 1000 is shown, according to one aspect of the present disclosure. In particular embodiments, the system described herein may process and prioritize the execution of transport directive calls (and other process calls) in various ways for optimizing overall system performance. For example, in scenarios where new transport directive calls are generally low in volume, the system may process the transport directive calls "on-demand," before processing new or preexisting process tasks (e.g., the other process tasks are "on-hold" until the transport directive call is completed). Generally, this method of processing transport directive calls generates an unnoticeable pause in a process until the transport directive call is completed, but allows for the transport directive call to be processed immediately (e.g., reducing latency associated with transporting data to other entities).

In certain embodiments, especially in scenarios with high transport directive call volume, the system may implement a queue, or the like, for temporarily storing transport directive calls (and other process calls) to allow for the system to prioritize the transport directive calls against other process tasks. In these embodiments, the system may process a particular transport directive call in the queue, continue to process other process tasks, and then return to processing other transport directive calls in the queue. According to various aspects of the present disclosure, the transport directive calls (and other process tasks) may include additionally encoded functionality, such that when the call/task is completed, another call/task may begin to execute (e.g., an "OnComplete" event). This exemplary functionality is described in greater detail below.

In one embodiment, the exemplary deferred transport execution process 1000 begins at step 1002, where the queue (e.g., a process queue integrated with the transport directive 112 shown in FIG. 1) receives one or more transport directive calls for processing. In various embodiments, the queue may operate on a first-in-first-out ("FIFO") basis, or the queue may allow for the order of execution to be prioritized (e.g., some transport directive calls receive favorable execution over others). According to various aspects of the present disclosure, the queue's default operating/execution method may be FIFO, and various queue items may be assigned elevated priorities being executed before other queue items. In some embodiments, the system may leverage queue concurrency (such that certain queue items may be executed out of order without affecting the overall outcome) to achieve efficiencies. In certain embodiments, integrating a queue with the transport directive 112 may allow for improved scalability, such that during periods of high transport directive call volume the system may execute/process the transport directive calls when best appropriate, rather than immediately.

At step 1004, according to various embodiments, the system executes the next transport directive call in the queue. As mentioned briefly above, the transport directive call to be executed may be the transport directive call that has been in the queue for the longest amount of time, or may have priority over other calls/tasks in the queue. Accordingly, in various embodiments, executing the next transport directive call may include retrieving the call from the queue and processing the call instructions via the process engine 120 or another component of the transport directive 112.

In one embodiment, at step 1006, the system determines if the transport directive call includes an OnComplete event. Mentioned briefly above, an OnComplete event is a nested event in a process directive call, where in response to completion of a particular process call or transport directive call, one or more additional events may automatically occur/initiate. In various embodiments, this functionality may be integrated into the general definitions (e.g., data structures)

of the process events, therefore allowing all transport directive calls to be generated with OnComplete events.

If, at step 1006, it is determined that the transport directive call does include an OnComplete event, the system may proceed to step 1008, where the system executes the transport directive call OnComplete event. In some embodiments, this OnComplete event may include updating a process document in a separate entity's process, generating new process documents, etc. According to various aspects of the present disclosure, if, at step 1006, it is determined that the transport directive call does not include an OnComplete event, the system may proceed to step 1010.

In particular embodiments, at step 1010, the system may determine if there are additional transport directive calls included in the queue. If it determined that there are more transport directives calls included in the queue, the system may execute the next transport directive call in the queue, at step 1004. If it is determined that there are no additional transport directive calls in the queue for processing, the process 1000 may end (e.g., in favor of executing other process tasks).

FIG. 11 is a diagram illustrating an exemplary remote transport directive process, according to one aspect of the present disclosure. In various embodiments, the system described herein may allow for separate and independent processes to coordinate process tasks, and remotely control (e.g., edit) each other's process states, via a "TransportEvent" transport directive call. As will be described in greater detail immediately below, in some embodiments, a particular process entity may remotely change a document (or another process data objet) that was originally sourced from the particular process entity but later transported to a plurality of separate process entities (e.g., an entity A transported the document to an entity B, and entity B transported the document to an entity C, etc.). According to various aspects of the present disclosure, the particular entity may remotely update the originally sourced document at the plurality of separate process entities, and the remote updates may appear to those separate entities to have been requested from their respective sourcing entities (e.g., entity C appears to receive the update from entity B, despite the update being originally requested by entity A).

Referring to the embodiment shown in FIG. 11, the diagram includes an exemplary process, where at the first step of the process (shown as step 1), the original source entity requests a remote update (or another remote change) at the immediate target entities associated with the source entity. In one embodiment, this remote update may be a "TransportDirective" call, or a "TransportEvent." In the present embodiment, the source entity is the organization A site, and the organization A site may include a RFI document with a target entity of organization B site. Accordingly, the organization B site may receive RFI document information from the organization A site to be included in its own process (e.g., a workflow). In response to updating or revising the RFI document at the organization A site, the organization A site may request to include the same updates at the target entities associated with organization A. Thus, at step 1 of the present process, the organization A site transmits a remote update TransportEvent to the organization B site for updating the RFI document (at the organization B site) originating from organization A. In various embodiments, the organization B site may include its own downstream target entities, where the downstream target entities may be other entities or organization sites including the RFI document or information originating from the organization A site, however, the downstream target entities received the RFI document from the organization B site.

In response to receiving and executing the remote update TransportEvent at the organization B site, the remote update TransportEvent may include instructions for the organization B site to forward the remote update TransportEvent to its respective target entities (as discussed briefly immediately above). In various embodiments, the organization B site may be the source entity for transmitting the RFI document (or data relevant to the RFI data) to one or more target entities, such as the organization C site and/or the organization D site. Accordingly, in various embodiments, the requested updates to the RFI document (or information relating to the RFI document, such as pointers to required data) originating from the organization A site may be forwarded from the organization B site to the organization C site and the organization D site. In one embodiment, this step is shown as step 2 in the present process, where the organization B site transmits the updates requested by the organization A site to both the organization C site and the organization D site. Thus, the RFI documents at both the organization C site and the organization D site may be updated to reflect the remotely requested change, and in some embodiments, these organization sites may further transmit the changes to their respective target entities (e.g., a target organization E site and a target organization F site).

Turning now to FIG. 12, a diagram 1200 of the application repository 118 and its exemplary functionality is shown, according to one aspect of the present disclosure. In various embodiments, and as discussed above in association with FIG. 1 and FIG. 5, the application repository 118 stores various workflow applications that may be installed on organization sites during an initial registration period, or at any other appropriate time during a workflow or process. In particular embodiments, additional applications may be installed after the registration of organization sites. In one embodiment, the application repository 118 allows for organization sites to collaboratively develop applications (both internally and between disparate entities), such that the application repository 118 stores versions of the applications created throughout the development process, and then merges different versions or iterations of an application for establishing a final or reconciled application version. As will be discussed in greater detail below, the application repository 118 may allow for application merging between internal parties associated with an organization site, and also may allow for application merging between external parties (e.g., consultants, third-party developers, etc.).

In one embodiment, the application repository 118 is operatively connected over a network (e.g., Wi-Fi, LTE, 5G, Ethernet, LAN, or any other appropriate wired or wireless network connection) to at least cloud platforms, third party entities, internal and external developers, etc. In various embodiments, the cloud platforms may include a proprietary platform for accessing and managing workflow applications; however, in particular embodiments, the cloud platforms may be external cloud platforms belonging to external systems and developers. In certain embodiments, the third parties connected to the application repository 118 may include external companies, developers, or any external entity in general. In a particular embodiment, the third parties may connect to the application repository via one of the above-mentioned network connections. Furthermore, in some embodiments, the third parties may access the application repository 118 via a secure connection or secure shell ("SSH"). In this way, the third parties may download and upload applications from the application repository 118 (based on their permissions), as needed. According to various aspects of the present disclosure, internal developers (e.g., developers belonging to the particular entity or organization that owns the application) may access the application repository 118 in ways similar to the cloud platforms and third parties.

In one embodiment, the application repository 118 includes one or more databases and/or servers configured to store and manage versions of workflow applications. As discussed herein, one or more organizations may download a workflow application from the application repository 118 for facilitating collaboration throughout a project pipeline. According to various aspects of the present disclosure, prior to downloading a workflow application from the application repository 118 for facilitating collaboration throughout a project pipeline, the present systems and methods allow for collaborative development of those applications (to be described in greater detail below).

Still referring to FIG. 12, the present embodiment includes representations of a Development Group A (labeled 1202) and a Development Group B (labeled 1204), both of which are in operable communication with each other via the application repository 118. In various embodiments, development groups are restricted computing environments or "sandboxes," in which organizations or sub-groups within organizations may develop and test the platform applications. In various embodiments, a sandbox generally refers to a computing environment that includes a high level of restriction or isolation from external computing environments, and permissions are generally required for accessing data stored within a sandbox.

In a particular embodiment, a single organization site may include a plurality of development groups, each of which may correspond to a single sub-group or team within the organization for developing certain aspects of the platform application. For example, an organization may establish a development group within the application repository 118 for storing and managing versions of applications created by a team of front-end user interface developers that work for the organization. Furthermore, the organization may also establish a development group within the application repository 118 for storing and managing versions of applications created by a team of back-end server-side developers that also work for the organization. In a particular embodiment, both teams of developers (front-end and back-end) may collaborate and rely on the other team's applications for developing and testing their respective applications. Accordingly, the present systems and methods, in various embodiments, allow for the front-end developers to access the applications developed by the back-end developers, and vice-versa, within their respective development groups.

For exemplary purposes, assume that the Development Group A 1202 in the present embodiment is the above-mentioned front-end development group, and the Development Group B 1204 is the above-mentioned back-end development group.

In particular embodiments, and continuing with the above example, the front-end developers may copy an application file from the back-end development group and replicate the application within the front-end development group. This step is shown as step 1 in the present embodiment, where an arrow indicates the Application V1 (version 1) from the Development Group B 1204 being transmitted (or copied) to the Development Group A 1202.

In various embodiments, the copied application may be modified as it progresses through a series of development processes, such as general development, quality assurance, release testing, etc. (as shown in the step 2, in the present embodiment). After modifications (if any) are made to the application, the modified application may be saved as an entirely new application within the front-end development group (as shown in step 3, in the present embodiment). In one embodiment, the new application, Application V2, may be transmitted to the back-end development group (as shown in step 4, in the present embodiment), where any changes between the modified application and the original application are reconciled (as shown in step 5, in the present embodiment), and a new application version is saved within the back-end development group (see Application V3, as shown in the present embodiment).

In various embodiments, the back-end development group may then accept (e.g., automatically, or at the approval of a user) the new application (Application V3) as the application version to be used for any future development within the back-end development group, which allows for both development group's application development needs to be accommodated in future processes and workflows. In some embodiments, the back-end development group may accept only a portion of the modifications made by the front-end development group, rather than every modification, if some of the application modifications are undesirable.

Turning now to FIG. 13, a flowchart of an exemplary application merging process 1300 is shown, according to one aspect of the present disclosure. In one embodiment, the application merging process 1300 may be executed by the system via one or more servers or processors of the application repository 118. Referring to the above described FIG. 12, the exemplary application merging process 1300 is generally executed in association with the step 5 of the diagram 1200, where the Application V1 and Application V2 are compared or reconciled for generating a new application.

In certain embodiments, the process 1300 may begin at step 1302, where the application repository 118 receives a request for merging a modified application with a source application, where, in response to receiving the request, the application repository 118 identifies the target development group in which the modified application is stored. According to various aspects of the present disclosure, applications stored in the application repository may include an identifier, or the like, corresponding to the particular development group from which the application originated.

Proceeding now to step 1304, in various embodiments, the application repository 118 may copy the source application to generate a copied application. In particular embodiments, copying the source application may include instantiating an empty application object at the target development group (or transmitting the copied application to the target development group), and furthermore populating the empty application object with data identical to the source application.

At step 1306, in a particular embodiment, the application repository 118 determines a delta between the copied application and the modified application. According to various aspects of the present disclosure, determining a delta between the copied application and the modified application may include comparing, at the data-level (or at an abstracted code-level), differences between the two applications. For example, one difference between two applications may be instructions to be executed upon completing a particular process task, or another difference may include conflicting pointers to entities for transmitting a workflow process document.

In certain embodiments, at step 1308, the application repository 118 may generate a merged application of the copied application and the modified application. In certain embodiments, the merged application may include some, or all, of the differences detected between the modified application and the copied application. In a particular embodiment, a user or administrator associated with the target development group may allow or deny merging of the detected differences, or the application repository may automatically merge the applications and allow for a user to retroactively review the merge process.

Proceeding now to step 1310, in one embodiment, the application repository 118 may store the merged application as a new application version in either the source development group, the target development group, both, or another related development group. Accordingly, the application repository 118 allows for changes made by internal or external entities to be efficiently shared and integrated within the development pipelines of the parties, or development groups, responsible for building the application.

Exemplary Architecture

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can include various forms of data storage devices or media such as RAM, ROM, flash memory, EEPROM, CD-ROM, DVD, or other optical disk storage, magnetic disk storage, solid state drives (SSDs) or other data storage devices, any type of removable nonvolatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions include, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed systems may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed system are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically includes one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the system is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems will be readily discernible from the description herein, by those of ordinary skill in the art. Many embodiments and adaptations of the disclosure and claimed systems other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed systems. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out simultaneously, contemporaneously, or in synchronization with other steps.

CONCLUSION

Aspects, features, and benefits of the claimed embodiment(s) will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the exemplary embodiments to the precise forms disclosed. Many modifications and variations are possible in light of the above teaching.

The embodiments were chosen and described in order to explain the principles of the embodiments and their practical application so as to enable others skilled in the art to utilize the embodiments and various embodiments and with various modifications as are suited to the particular use contemplated. Alternative embodiments will become apparent to those skilled in the art to which the present discussion pertains without departing from their spirit and scope. Accordingly, the scope of the present embodiments is defined by the appended claims rather than the foregoing description and the exemplary embodiments described therein.

We claim:

1. A system comprising:
    an application versioning database comprising a repository of one or more applications, wherein each application corresponds to a particular development group within the application versioning database, and wherein each particular development group comprises a sandboxed computing environment accessible to permissioned application developers and users;
    a mapping database for storing data mapped between a plurality of development groups, wherein the mapped data corresponds at least to permissions defining access rights to the one or more applications associated with the plurality of development groups; and
    at least one server comprising one or more processors, the at least one server operatively connected to the application versioning database and the mapping database, the at least one server configured for:
        upon receiving a request for merging a modified application with a source application in a source development group, identifying a target development group corresponding to the modified application;
        generating a copied application from the source application;
        transmitting the copied application to the target development group;
        determining a delta between the modified application and the copied application, wherein the delta comprises development changes between the modified application and the copied application; and
        generating a merged application comprising the copied application and at least a portion of the delta.

2. The system of claim 1, wherein the merged application is denoted as a new version in the target development group.

3. The system of claim 1, wherein determining the delta comprises comparing the modified application to the copied application for differences in the application coding.

4. The system of claim 1, wherein the at least one server is further configured for transmitting the merged application to the source development group for indicting the merged application as an updated application version.

5. The system of claim 4, wherein the at least one server is further configured for transmitting the merged application to the source development group according to a predetermined time interval.

6. The system of claim 5, wherein the at least one server is further configured for transmitting the merged application to one or more additional development groups, wherein the one or more additional development groups include copies or versions of the source application.

7. The system of claim 1, wherein the access rights comprise permissions for downloading from and uploading application versions to each of the plurality of development groups.

8. An application versioning process comprising:
providing at least one server comprising one or more processors, the at least one server operatively connected to an application versioning database and a mapping database, wherein the application versioning database comprises a repository of one or more applications, each application corresponding to a particular development group within the application versioning database, and wherein each particular development group comprises a sandboxed computing environment accessible to permissioned application developers and users, and wherein the mapping database stores data mapped between a plurality of development groups, wherein the mapped data corresponds at least to permissions defining access rights to the one or more applications associated with the plurality of development groups, wherein the at least one server is configured for:
  upon receiving a request at a server for merging a modified application with a source application in a source development group, identifying a target development group corresponding to the modified application;
  generating a copied application from the source application;
  transmitting the copied application to the target development group;
  determining a delta between the modified application and the copied application, wherein the delta comprises development changes between the modified application and the copied application; and
  generating a merged application comprising the copied application and at least a portion of the delta.

9. The application versioning process of claim 8, wherein the merged application is denoted as a new version in the target development group.

10. The application versioning process of claim 8, wherein determining the delta comprises comparing the modified application to the copied application for differences in the application coding.

11. The application versioning process of claim 8, wherein the at least one server is further configured for transmitting the merged application to the source development group for indicting the merged application as an updated application version.

12. The application versioning process of claim 11, wherein the at least one server is further configured for transmitting the merged application to the source development group according to a predetermined time interval.

13. The application versioning process of claim 12, wherein the at least one server is further configured for transmitting the merged application to one or more additional development groups, wherein the one or more additional development groups include copies or versions of the source application.

14. The application versioning process of claim 8, wherein the access rights comprise permissions for downloading from and uploading application versions to each of the plurality of development groups.

* * * * *